United States Patent
Olson et al.

[11] Patent Number: 5,838,579
[45] Date of Patent: Nov. 17, 1998

[54] STATE DEPENDENT POWER MODELING

[75] Inventors: Janet Olson, Saratoga; Ivailo Nedelchev, Santa Clara; Yuegin Danny Lin; Ashutosh S. Mauskar, both of Sunnyvale; James Sproch, Saratoga, all of Calif.

[73] Assignee: Synopsys, Inc., Mountain View, Calif.

[21] Appl. No.: 740,502

[22] Filed: Oct. 29, 1996

[51] Int. Cl.⁶ .................................................. G06F 17/50
[52] U.S. Cl. ........................................ 364/488; 364/578
[58] Field of Search .................................. 364/488, 489, 364/490, 491, 578; 395/500

[56] References Cited

U.S. PATENT DOCUMENTS 5,668,732   9/1997   Khouja et al. .......................... 364/483

*Primary Examiner*—Emanuel Todd Voeltz
*Assistant Examiner*—Matthew Smithers
*Attorney, Agent, or Firm*—Wagner, Murabito & Hao

[57] ABSTRACT

A system and method for modeling the power consumed by a logic cell in a computer controlled power estimation process estimating the power consumed for an integrated circuit represented by logic cells and connections between cells. The present invention models power consumption within a logic cell associated with a particular pin (e.g., input, output, bidirectional, internal) based on a prescribed condition of the state of signals that exist contemporaneously with a signal transition on the particular pin. This is referred to as state dependent power modeling. A different power consumption value can be provided for each different modeled state. The logic cells and the power consumption model for them are stored in a logic cell "library" within the computer system. State dependent power modeling of the present invention allows library designers to specify a different set of power values depending on the condition of one or more pins of the library cell (e.g., the library's representation of the logic cell). Specifically, library designers are allowed to specify a "when" condition with their power tables. To take advantage of the state dependent power modeling, library designers can specify multiple power tables in the library cell with different when conditions. State dependent power modeling is important for those cells for which a certain condition of the pins makes the logic cell consume more or less power than the otherwise recorded "average" power rating used in conventional libraries. Examples of these cells are random access memories (RAMs), input/output cells (IOs), and enabled flip-flops.

23 Claims, 20 Drawing Sheets

STATE DEPENDENT POWER MODELING

BACKGROUND OF THE INVENTION

1. Field of the Invention

The present invention relates to the field of electronic design automation (EDA). More specifically, the present invention relates to the field of power modeling for logic cells used in EDA applications.

2. Prior Art

In the field of EDA, in one level of abstraction in the design process, integrated circuit (IC) designs are represented by cells (e.g., logic cells) and interconnections between the cells. Often the IC design has associated with it a number of constraints that the EDA system needs to satisfy during logic synthesis and/or optimization. These constraints include timing constraints, area constraints, and power consumption constraints. There are well known EDA processes that determine if a synthesized IC design meets the given constraints and that perform certain steps if the constraints are not met. If a design does not meet one or more constraints after optimization, it is often redesigned by a designer in order to fall within the prescribed constraints. Therefore, it is important for an EDA system to accurately determine the amount of power consumed by the individual cells of the IC design so that the EDA system can accurately report whether or not the IC design, as an aggregation of individual cells, meets the prescribed power constraints.

Circuits or logic elements are represented in EDA by logic cells whose electrical, timing, logic, and power characteristics and behavior are represented in an entry in a library as a library cell. The libraries are stored in a computer readable format within a computer readable memory for use by appropriate EDA processes. The libraries are typically technology dependent, e.g., CMOS, FPGA, etc., and vary by technology manufacturer (e.g., LSI, Xilinx, etc.). The developer of the library of logic cells needs to characterize each individual logic cell and report, in the library, the above logic cell characteristics, including the power consumed by the logic cell. The more accurate are the individual logic cell characterizations found in the logic cell library, the more accurate is the EDA aggregate report regarding all the cells of a given integrated circuit design.

Currently, prior art library developers can only specify one internal power lookup table at each output pin or input pin of a library cell and one leakage power value per library cell. The internal power table associated with an output pin is then referenced when the output pin switches (transitions), regardless of the state of any signals at the time of transition or regardless of which input pin path caused the output transition. An example is shown with reference to FIG. 1A. A logic cell 10 is shown having four gates 11, 13, 15, 17, and 19 and seven inputs, A–G, and one output, O, taken from gate 19. The prior art library representation for cell 10 includes a power consumption model that indicates a certain amount of estimated power consumption for a transition at the output pin 19a, regardless of what signal state or input pin caused the transition. The power consumed by the cell within this prior art power consumption model for a particular output transition is basically an average of all power consumed by the cell as a result of each possible input state that could cause output O to transition.

This prior art modeling technique leads to inaccuracies during power estimation because the actual power consumed by logic cell 10 varies depending on which input caused the output transition or the state (condition) of any signals existing at the time of the transition. For instance, if input G (FIG. 1A) caused the output transition, only gate 19 is used to cause output O to transition. However, if inputs A and B caused the output transition, gates 11, 13 and 19 are used, thereby creating a longer path from the inputs (A/B) to the output (O) and thereby consuming more power over the former case. Although the prior art library model gives an average power consumption estimation by averaging the output transition power consumption over each input transition, for any particular use of logic cell 10 (e.g., for any particular application of logic signals to the inputs A–G) the prior art model can and does often give inaccurate power consumption results. What is needed is a power modeling system and method that advantageously allows power modeling of a library cell to include information regarding the logic cell's power consumption given an input transition over a particular input pin of the logic cell. One aspect of the present invention provides such advantageous functionality.

Furthermore, the prior art power consumption model gives a library cell's power consumption for an output transition regardless of the state of the input signals that caused the transition. In many instances, a logic cell consumes different amounts of power depending on the condition of the input signals that caused the transition. For instance, FIG. 1B illustrates a random access memory cell 21 (RAM) having an address bus input (ADDR), a data bus input/output (DATA), a read signal, a write signal, and an enable signal (EN). Depending on whether the RAM cell 21 is in read or write mode (as indicated by the state of input signals), the internal and leakage power used by the RAM cell 21 can be quite different. Also, depending on whether or not RAM cell 21 is enabled also impacts the power consumption of RAM cell 21. The prior art power model assigns one "averaged" power consumption amount for RAM cell 21 regardless of the state of the input signals. Therefore, the prior art model either reports too much power consumption or too little power consumption for an application of the RAM cell 21 that performs mostly reads or that performs mostly writes (or vice-versa). What is needed is a power modeling system and method that advantageously allows a library cell to include information regarding the logic cell's particular power consumption given a particular condition (e.g., signal state) that exists contemporaneously with a transition causing the power consumption. One aspect of the present invention provides such advantageous functionality.

Another aspect of EDA power estimation is common power. Common power is the power consumed in the common logic among multiple outputs. It is also the power consumed in the logic which may transition without the output changing. FIG. 1C illustrates a logic cell 50 for a case of common logic shared between two outputs Y and Z. In this case, input A can cause both outputs Y and Z to change. However, the library developer needs to ensure that the power of gate 51 is not counted twice in the power model. This is difficult to perform in prior art library power modeling because the power consumed for a transition of output Y and Z is reported irrespective of the input lines or the conditions of the input signals that caused the transition. What is also needed is a system to provide accurate power modeling for the common logic case shown in FIG. 1C.

Internal power is any power dissipated within the boundary of a cell. This includes short circuit power, as well as the power dissipated due to the charging and discharging of any other existing capacitances internal to the cell. This definition does not distinguish between a cell's short circuit power and other power dissipated internally due to the charging and discharging of internal capacitances during switching. Short circuit power is the power consumed by the cell during a signal transition when both the P and N type transistors can be ON simultaneously. During this short time, current flows from Vdd to ground causing short circuit power dissipation. A cell's internal power is the sum of the internal power of all of the cell's inputs and outputs as modeled in the library.

Internal power of a cell is determined by prior art libraries based on: (1) a single value representing the output load capacitance of an output pin of the cell; and (2) a value representing the input transition time of a signal of an input pin of the cell. Generally, the longer the transition time, the more power is consumed and the more the load capacitance, the more power is consumed. The exact function of power consumption based on input transition time and output load capacitance is determined based on linear interpolation within a model of reference index and reference power points. FIG. 2A illustrates a sample two dimensional power lookup table 30 of the prior art. The prior art table 30 is two dimensional because two input reference indices are used, one along the y dimension which represents output load capacitance (pf) of the cell, and one along the x-dimension which represents weighted average input transition time (ns). The power value output is then modeled along the vertical (z-axis). The library cell's power model includes a group of reference power points 32a–32d that corresponds to reference index points along the x-dimension and y-dimension. The reference index and power points are included in the power model for the representative library cell. A particular power consumption value at point 32 representing a particular input transition time and a particular output load capacitance (e.g., x'=0.34, y'=110.1) is determined by linear interpolation with respect to the reference index and power points. The above library models are formulated on an output pin-by-output pin basis for each cell.

FIG. 2B illustrates an example cell 40 (e.g., a flip-flop) having a first output 42 (e.g., O) and a second output 44 (e.g., O') whereby the first output 42 and the second output 44 switch contemporaneously. Using the power model 30 of FIG. 2A, each output of cell 40 has its own power consumption model since only one output load capacitance value is allowed in the model 30. However, it is often difficult for library developers to apportion the output power between the output 42 and output 44 for cell 40. This is the case for one reason because power consumption is measured by input current to cell 40, and since both outputs switch contemporaneously, only one current is measured for both outputs. Further, since many library developers do not want to analyze the specific internal circuitry 41 causing the second output 44 to switch, it is difficult to apportion the power consumption of cell 40 between the first output 42 and the second output 44 on a gate level. What results in prior art power modeling for cell 40 is often a doubling of the power consumption for cell 40 whereby the same power consumption value is placed on both output 42 and output 44 in the library. This causes an over estimation of the power consumed by cell 40 during power estimation processes. Alternatively, in the prior art model, only one power consumption value is placed on output 42 and nothing on output 44 (or vice-versa), causing an under estimation of the power consumed by cell 40. What is needed is a method and system for providing increased accuracy in power estimation for a cell having two outputs which switch contemporaneously. The present invention provides these advantages.

Accordingly, the present invention provides a system and method that advantageously allows power modeling of a library cell to include information regarding the logic cell's power consumption given an input transition over a particular input of the logic cell. Further, the present invention provides power modeling of a library cell which includes information regarding the logic cell's power consumption given a particular condition (e.g., signal state) that exists contemporaneously with a pin transition causing the power consumption. The present invention also provides the above system including an accurate power modeling for the common logic case described above. The present invention yet provides a system, as above, offering increased accuracy in power estimation for a cell having two outputs which switch contemporaneously. By allowing a gate-level power estimation process to be more accurate, the present invention advantageously avoids the need to perform a lengthy and design-size limited transistor-level cost estimation process. These and other advantages not specifically discussed above will become clear within discussions of the present invention herein.

SUMMARY OF THE INVENTION

A system and method are described for modeling the power consumed by a logic cell in a computer controlled power estimation process estimating the power consumed for an integrated circuit represented by logic cells and connections between cells. The present invention models power consumption within a logic cell associated with a particular pin (e.g., input, output, bidirectional, internal) based on a prescribed condition of the state of signals that exist contemporaneously with a signal transition on the particular (e.g., designated) pin. This is referred to as state dependent power modeling. A different power consumption value can be provided for each different modeled state. The logic cells and the power consumption model for them are stored in a logic cell "library" within the computer system. State dependent power modeling of the present invention allows library designers to specify a different set of power values depending on the condition of one or more pins of the library cell (e.g., the library's representation of the logic cell). Specifically, library designers are allowed to specify a "when" condition with their power tables. To take advantage of the state dependent power modeling, library designers can specify multiple power tables in the library cell with different when conditions. State dependent power modeling is important for those cells for which a certain condition of the pins makes the logic cell consume more or less power than the otherwise recorded "average" power rating used in conventional libraries. Examples of these cells are random access memories (RAMs), input/output cells (IOs), and enabled flip-flops.

Specifically, an embodiment of the present invention includes a computer readable memory having stored therein a power consumption model used for estimating power consumed by a physical circuit of an integrated circuit device, the power model having: a designation for a set of signals for a library cell representative of the physical circuit; a designation of at least one designated signal pin of the library cell; associated with the designated signal pin, a definition of a first state of the set of signals; and associated with the designated signal pin, a definition of a first power consumption function representative of power consumed by the physical circuit upon a transition on the designated signal pin provided the first state exists contemporaneously with the transition on the designated signal pin. Embodiments include the above and wherein the power consumption model further comprises: associated with the designated signal pin, a definition of a second state of the set of signals; and associated with the designated signal pin, a definition of a second power consumption function representative of power consumed by the physical circuit upon a transition on the designated signal pin provided the second state exists contemporaneously with the transition on the designated signal pin.

Embodiments also include the above and further having: a designation of a particular signal pin associated with a signal of the set of signals wherein a transition on the particular signal pin causes a transition on the designated signal pin; and associated with the designation signal pin, a definition of a power consumption function representative of power consumed by the physical circuit upon a transition on the designated signal pin provided: (1) the first state exists contemporaneously with the transition on the designated signal pin; and (2) a transition occurs on the particular signal pin causing the transition on the designated signal pin.

DETAILED DESCRIPTION OF THE INVENTION

In the following detailed description of the present invention, state dependent power modeling, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

I. NOTATION AND NOMENCLATURE

Some portions of the detailed descriptions which follow are presented in terms of steps, procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 3), or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM ENVIRONMENT

Figure 1A:
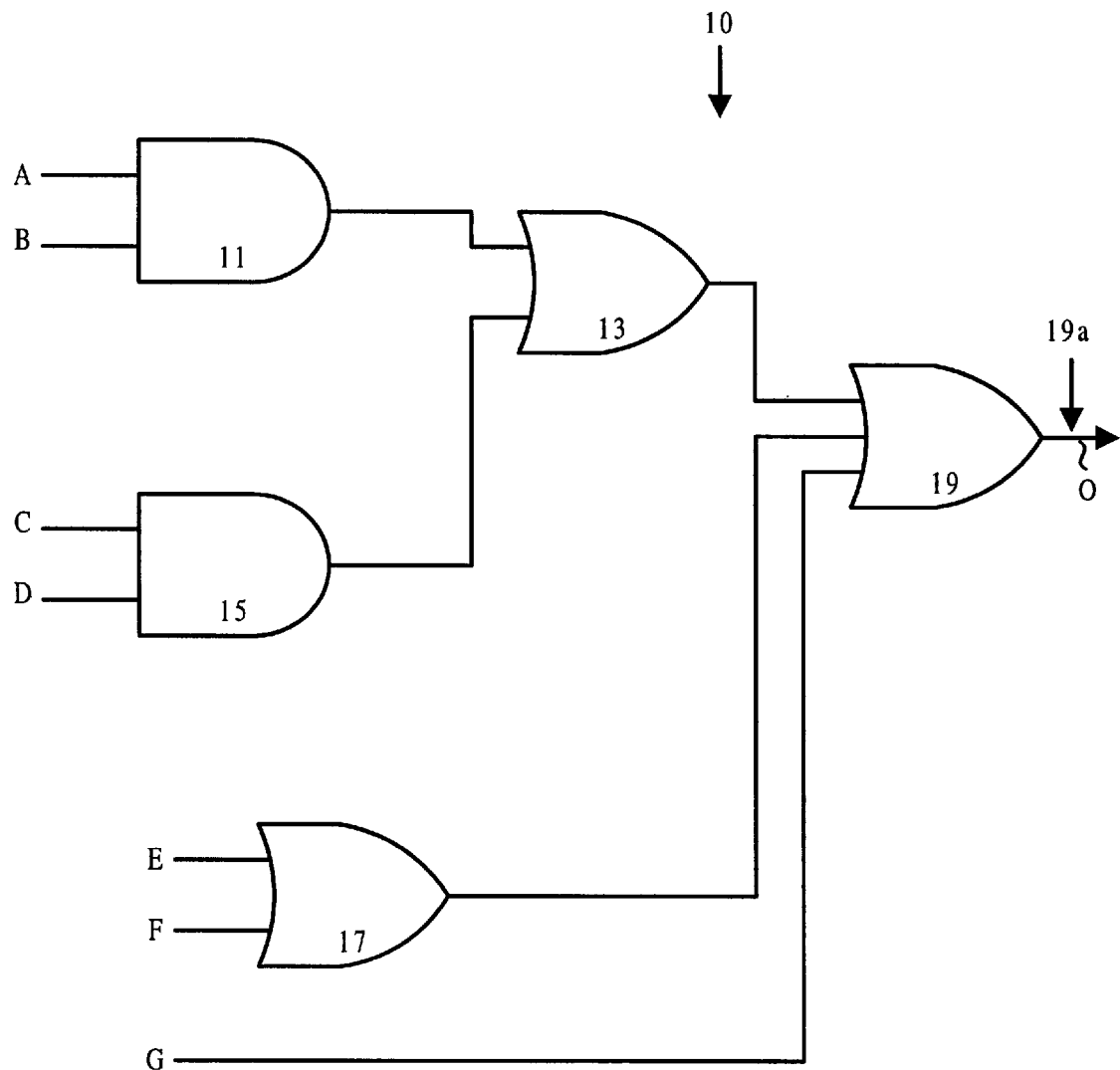
FIG. 1A illustrates an exemplary cell wherein power consumption varies depending on which input transition path caused the output transition.
Figure 1B:
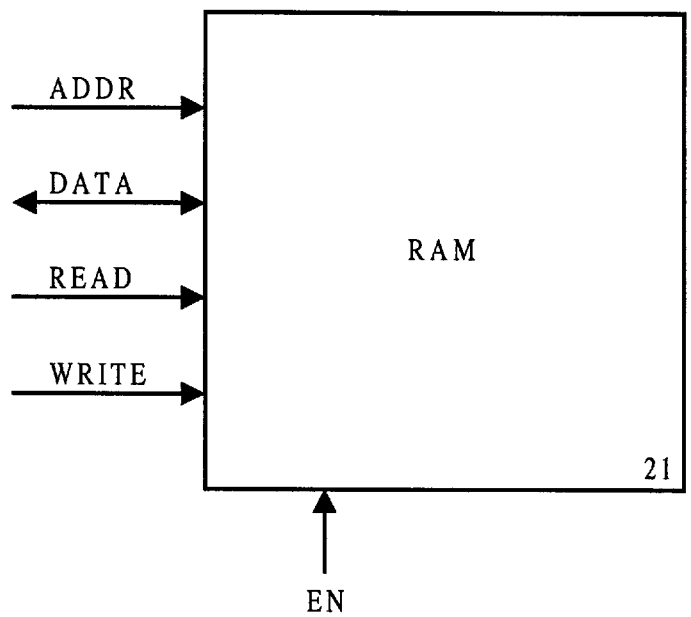
FIG. 1B illustrates an exemplary cell wherein power consumption varies depending on the state of the input signals at the time of the power measurement.
Figure 1C:
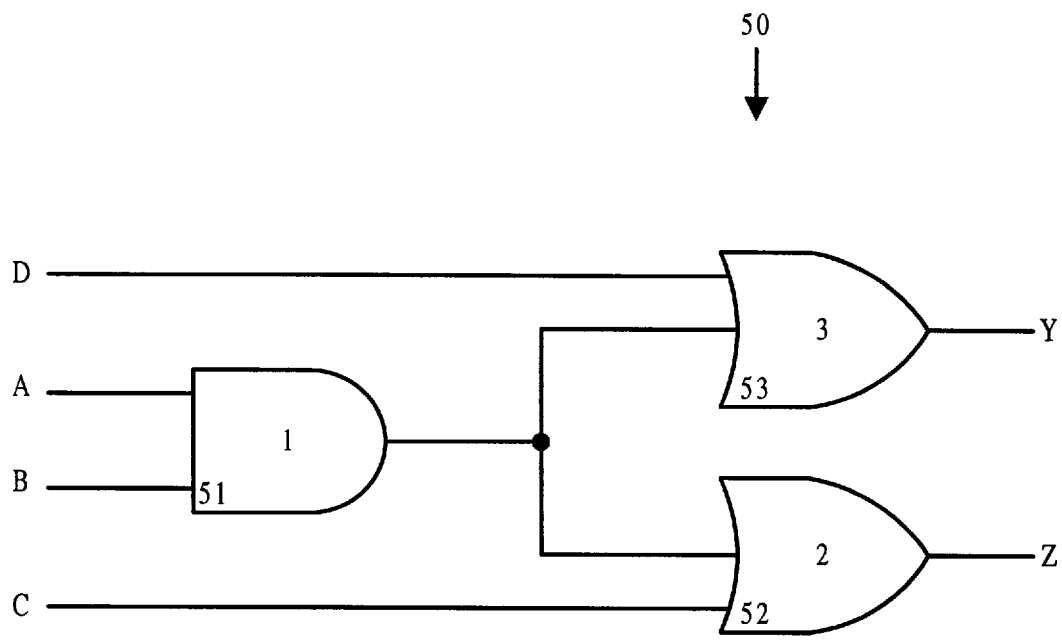
FIG. 1C illustrates an exemplary cell exhibiting the need for common logic power modeling.
Figure 2A:
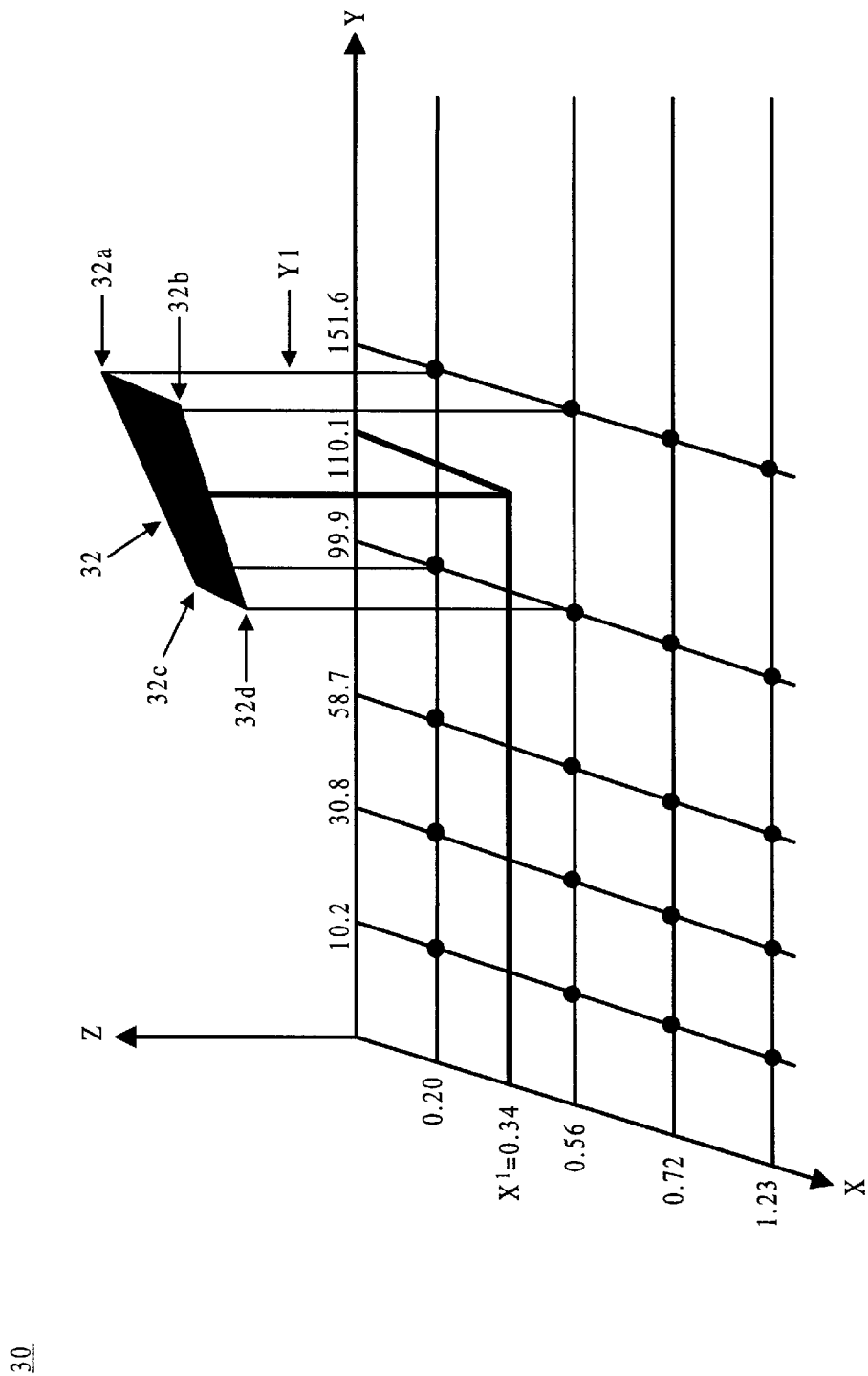
FIG. 2A illustrates a prior art two dimensional library model for power consumption of a logic cell.
Figure 2B:
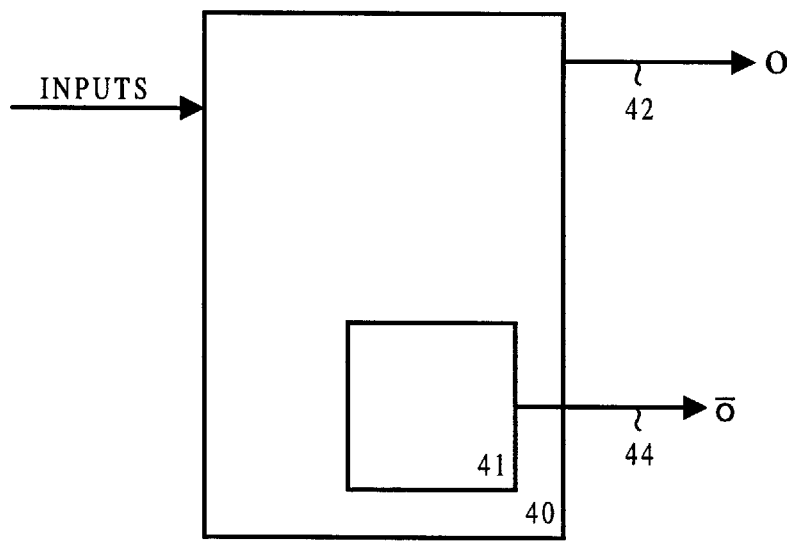
FIG. 2B illustrates an exemplary logic cell having a first and a second output that transition contemporaneously.
Figure 3:
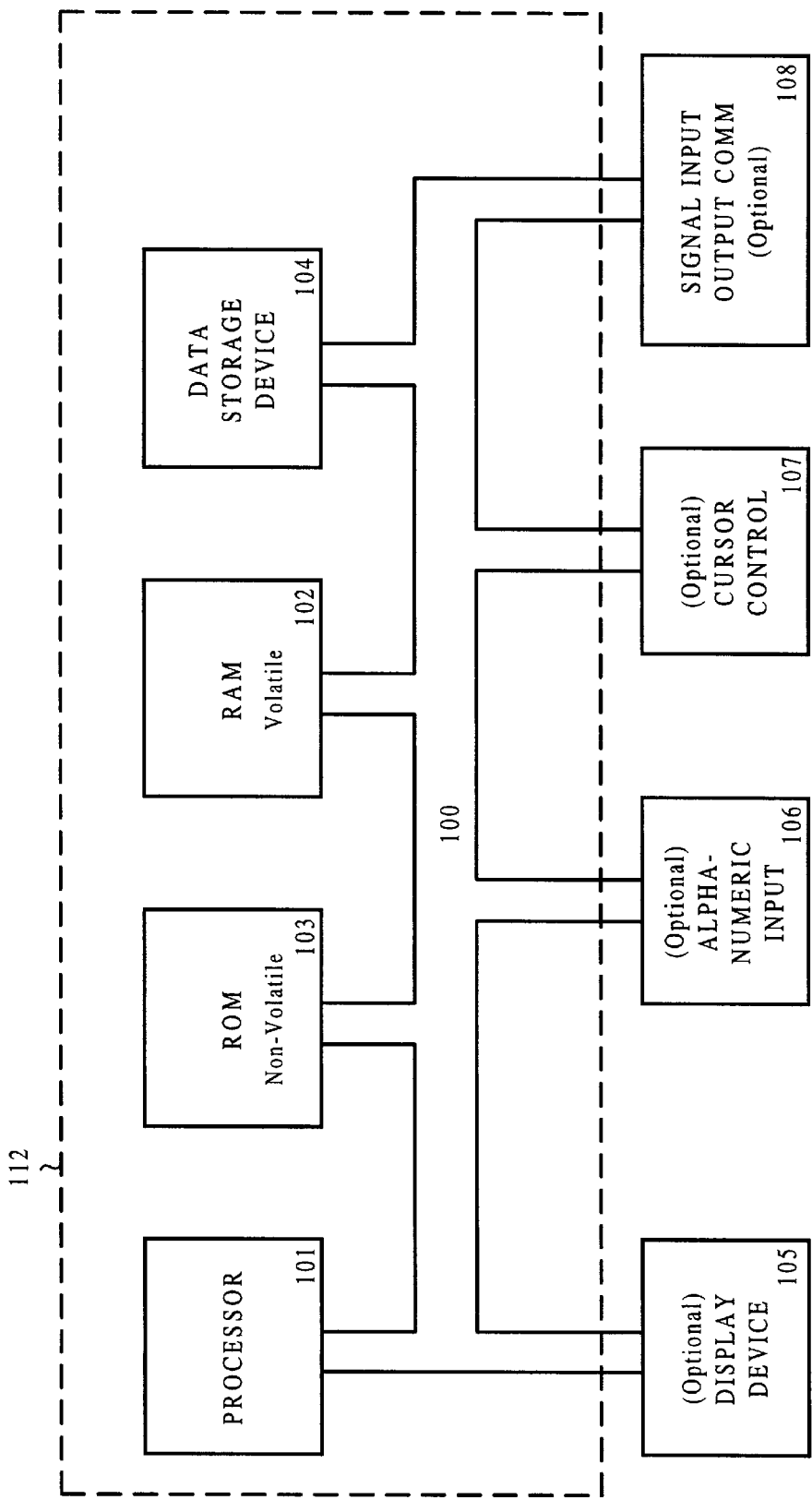
FIG. 3 is a logical block diagram of a computer system utilized in accordance with the present invention power modeling embodiments.

Refer to FIG. 3 which illustrates an exemplary computer system 112. Within the following discussions of the present invention, certain processes, steps, structures, models, tables, and libraries are discussed that are realized, in one implementation, as a series of instructions (e.g., software program) and/or data that reside within computer readable memory units of system 112 and executed and/or read by processors of system 112. When executed, the instructions cause the computer system 112 to perform specific actions and exhibit specific behavior which are described in detail to follow where appropriate. Further, the models, libraries, and data structures discussed herein are stored in computer readable memory units of system 112 and represent physical characteristics and behaviors (e.g., power consumption) of physical integrated circuits (e.g., gates, connections between gates, etc.).

In general, computer system 112 of FIG. 3 used in accordance with the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an optional alphanumeric input device 106 including alphanumeric and function keys coupled to the bus 100 for communicating information and command selections to the central processor(s) 101, an optional cursor control device 107 coupled to the bus for communicating user input information and command selections to the central processor(s) 101, and an optional signal generating device 108 coupled to the bus 100 for communicating command selections to the processor(s) 101.

II. STATE DEPENDENT POWER MODELING

The present invention provides a library cell model (state dependent model) for the power consumption of a particular pin of a library cell wherein the power model depends on the condition or state of specific signals, e.g., the state of specific input, output, internal and/or bidirectional signals that are present contemporaneously with a transition over a pin causing the power consumption. The state dependent model of the present invention is particularly advantageous for library cells whose actual power consumption varies depending on the state of certain signals (e.g., input, output, internal, bi-directional) pertinent to the library cell. One example given above is the random access memory cell (or RAM) which consumes different amounts of power depending on whether it is in the read state or in the write state, as indicated by the state of certain signals (e.g., input signals) of the library cell. Further, the RAM cell consumes different power amounts whether or not it is enabled. Each of these conditions can be represented by functions of the state of certain signals (e.g., input signals, in this case) including the read signal, the write signal, and the enable signal, etc. The present invention provides a power model stored within computer readable memory that allows a library developer to indicate particular power consumption amounts for a library cell, for a transition over a designated pin, depending on the state of certain signals of the library cell that exist contemporaneously with the transition over the designated pin.

Within the present invention, the library cell and its power model (e.g., whether state dependent, power dependent, or three dimensional power table) represent the physical power consumption of a particular, physical, integrated circuit element.

With respect to state dependent modeling, a state that exists "contemporaneously" with the transition of a designated pin is defined herein. A signal transition over an input pin can cause a transition of a designated pin of a state dependent power model. In addition, the state of any other pins (e.g., input, output, internal, bidirectional) of the library cell are important in defining the power consumption of the library cell at the time of the dedicated pin's transition. The state of "any other" signal pins can also include the static and/or transitional state of the above referenced input pin. The state of these "any other" pins is evaluated contemporaneously with a signal transition over the designated pin within the state dependent power model of the present invention. The term contemporaneously with a signal transition on the designated pin means: (1) at or near the time of this transition of the designated pin; and/or (2) at or near the time of a signal transition over the above referenced input pin that causes the designated pin to transition. Typically these two events occur closely in time, but need not within the scope of the present invention.

Figure 4:
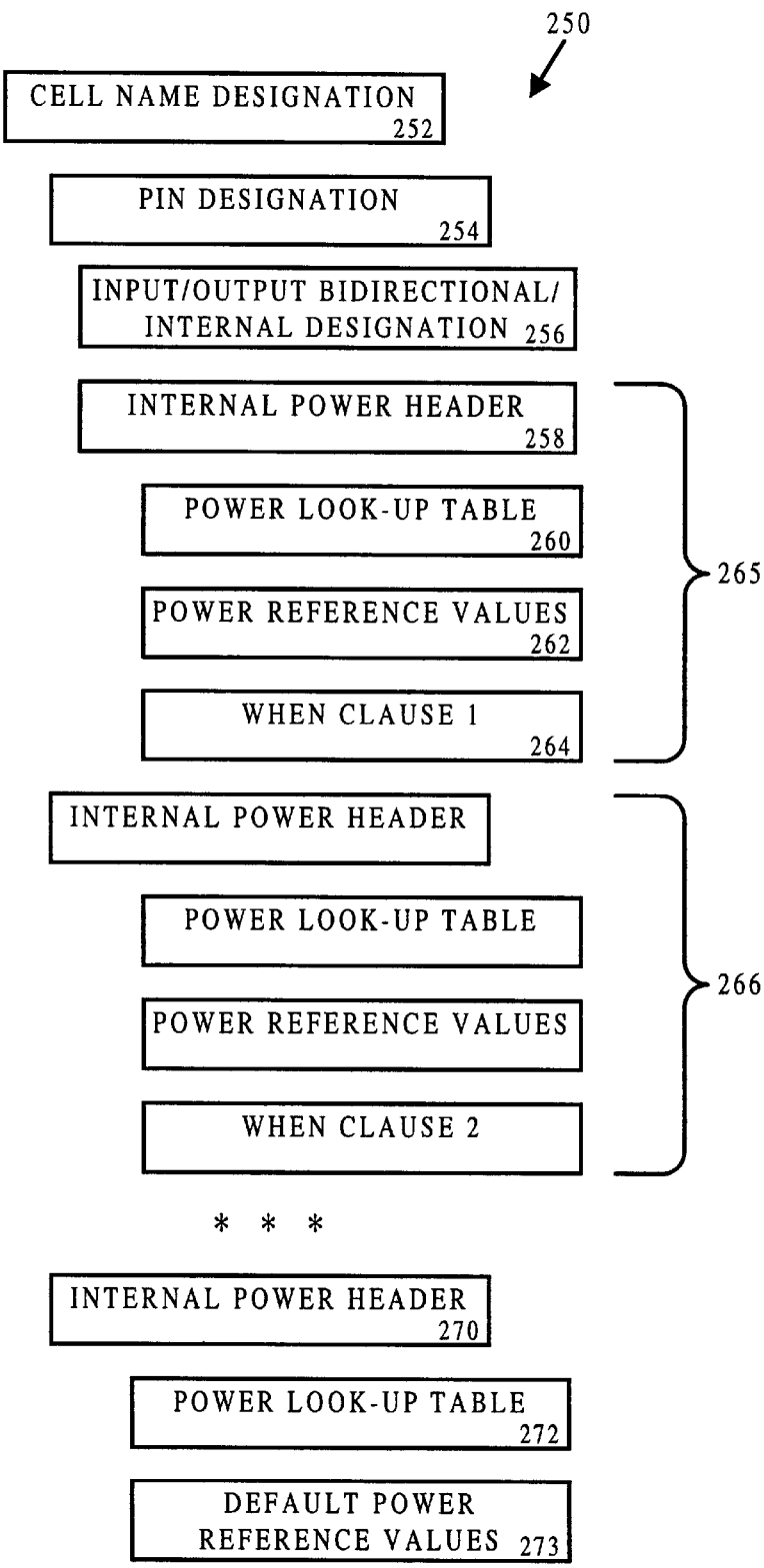
FIG. 4 illustrates a generic state dependent power modeling structure in accordance with one embodiment of the present invention.

FIG. 4 illustrates a generic data structure 250 utilized in accordance with the present invention state dependent model to represent power consumption within a logic cell. Data structure 250 resides within computer readable memory units of system 112 (FIG. 3) and is accessed by processor 101 during power estimation (see FIG. 14). The particular logic cell modeled by structure 250 is identified by a cell name designation (data field) 252. A cell library includes many logic cell power models 250, one for each distinct cell supported by the technology specific library. For each pin of the logic cell whose transition causes a power consumption event, the present invention state dependent data structure 250 allows a library cell developer to specify: (1) certain conditions, e.g., signal states; and (2) the specific power consumed by the logic cell during those conditions with respect to a transition over a designated pin. For instance, FIG. 4 illustrates power consumption information for one pin of the designated cell; this designated pin is identified by the pin designation field 254. It is appreciated that one pin is shown for clarity only and that structure 250 can contain analogous definitions for multiple designated pins of the designated cell. This aspect is shown in an example discussed further below.

For each pin designation 254, the structure 250 contains an identification of whether the designated pin is an input pin, output pin, internal pin, or bidirectional pin. This information is contained in the input/output/internal/bidirectional designation 256. It is appreciated that in many logic cells, the transition of an input pin causes a power event within the logic cell irrespective of whether or not an output signal transitions. For example, the clock pulse on a flip-flop cell causes a power event within the flip-flop cell although the output (Q) may not change. Further, in many combinational logic circuits, an input transition can cause many intermediate circuits to alter state while the final output of the cell does not transition in response to the input transition.

For each pin designation 254, the structure 250 of FIG. 4 contains one or more internal power headers 258 indicating that power modeling information is to follow (within an internal power group 265) regarding the designated pin of the designated cell. Within each internal power group 265 associated with an internal power header 258, the present invention contains an identification designation 260 of a power look-up table used in determining the power consumption for the designated pin/cell. Also within each internal power group 265 associated with an internal power header 258, the present invention contains a list of power reference values 262 for use in conjunction with the designated power look-up table 260 for determining the power consumption for the designated pin/cell.

Also included within each internal power group 265 of FIG. 4 is a "when" clause 264 indicating the state of specific signals of the logic cell for which the particular internal power group 265 applies. The when clause 264 typically contains a function of selected signals to represent the identified or designated static state. Although shown as at the end of an internal power group 265, the when clause 264 can be positioned at any place within the internal power group 265 within the scope of the present invention. The particular internal group 265 is used to evaluate the power consumption of the library cell provided the state of the selected signals 264 exists contemporaneously with a transition over the designated pin 254.

During power analysis, if the state of the identified signals at 264 is present contemporaneously with a transition at the pin identified by designation 254, then the power information designated within 260 and 262 is used to determine the power consumed by the logic cell designated by 252 based on a given input signal transition time and/or one or more output capacitance values associated with the power event.

As shown in FIG. 4, a particular pin can have more than one internal power group. Structure 250 contains a second internal power group 266 for the designated pin/cell which contains a different "when" clause for the designated pin. It is appreciated that the functions of each "when" clause for a designated pin are mutually exclusive within the preferred embodiment the present invention. At the completion of a pin designation, the present invention data structure 250 includes a default power consumption group (270, 272, 273) for the designated pin. This default internal power group contains the default power consumption values when none of the when conditions are true for the designated pin 254. Designation 270 indicates an internal power header while designation 272 indicates a power look-up table for the default condition. Designation 273 indicates the default power values used for the designated power look-up table 272. It is appreciated that the absence of a "when" clause within an internal power group of structure 250 indicates the default cause for the designated pin. State dependent power model structures based on designated input pins do not need default internal power groups. State dependent power model structures based on designated output pins generally require a default internal power group unless their associated internal power groups exhaustively define each possible input state.

It is appreciated that within the state dependent power model of the present invention, when statements are allowed to be Boolean expressions of the library cell signals (e.g., input, output, internal, bidirectional). This allows library developers to specify state dependent power which is related to both input and output pins for a given library cell. Therefore, under the present invention there is no restriction that there can only be one internal power table per output or input pin (as in the prior art). In accordance with the present invention, there can be multiple internal power tables defined per designated output or input pin. Each power table of the multiple power tables is represented by one internal power group of the state dependent model data structure 250

(FIG. 4). This is advantageous because a designated pin/cell can have multiple different power consumption functions based on different input states.

Although a number of different programming and data structure languages can be used to implement the specifics of the generic outline of FIG. 4, one exemplary structure of the state dependent power modeling of the present invention is described below. The exemplary power model is representative of an exemplary cell 210 shown in FIG. 5. The cell 210 contains two logic gates 212 and 216, three inputs A, B and C, and one output Z. The look-up tables (LUTs), input_by_trans and output_by_cap, are one dimensional LUTs because they contain only one input index, however, two or three dimensional LUTs are equally well suited for application with the state dependent structure shown below. These LUTs contain reference index values and their structures are shown following the exemplary power model structure.

Exemplary State Dependent Power Model Structure

```
cell(mycell) {
    pin(A) {
        direction : input;
        internal_power( ) {
            power(input_by_trans) {
                values("1.5, 2.5, 4.7");
            }
            when : "B";
        }
        ...
    }
    pin(B) {
        direction : input;
        internal_power( ) {
            power(input_by_trans) {
                values("1.5, 2.5, 4.7");
            }
            when : "A";
        }
        ...
    }
    pin(C) {
        direction : input;
        ...
    }
    pin(Z) {                                            ** default **
        direction : output;
        internal_power(output_by_cap) {
            power(output_by_cap) {
                values("2.0, 5.0, 9.0");
            }
        }
        ...
    }
}
```

Output_by_Cap and Input_by_Trans LUTs

```
library(internal_power_example) {
    power_lut_template(output_by_cap) {
        variable_1 : total_output_net_capacitance;
        index_1("0.0, 5.0, 20.0");
    }
    power_lut_template(input_by_trans) {
        variable_1 : input_transition_time;
        index_1("0.0, 1.0, 2.0");
    }
}
```

As described above, the above reference index values associated with the structure of the LUTs are used in conjunction with the reference power values given within the internal power groups of a power model of the present invention during linear interpolation. During power analysis, particular input transition times or particular output capacitance values are linearly interpolated with the above reference values, using well known processes, to obtain the actual power consumed by the library cell for a given power event.

Figure 5:
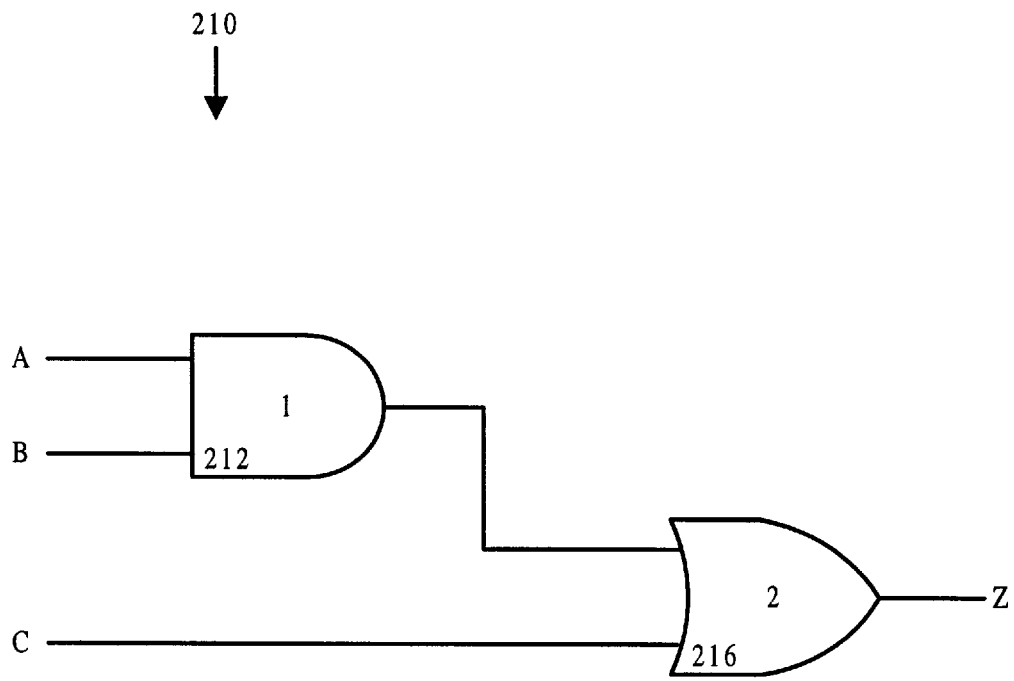
FIG. 5 illustrates an exemplary library cell having different power consumption functions depending on the state of its input signals.

As seen above and with reference to FIG. 5, pin A has one internal power group as does pin B; pin C has no internal power group and pin Z has one internal power group. Library cell 210 exhibits a particular power usage function ("1.5, 2.5, 4.7") for a transition on pin A contemporaneously when function B is true (e.g., state B exists). Otherwise, for all other power events causing a transition on A, the power consumed by cell 210 is 0. If state B exists, then a transition on A causes gate 212 to propagate the transition, otherwise gate 212 is not active and therefore consumes no power. A similar case exists for a transition on B if A is present, as shown by the above exemplary power model structure.

Figure 6A:
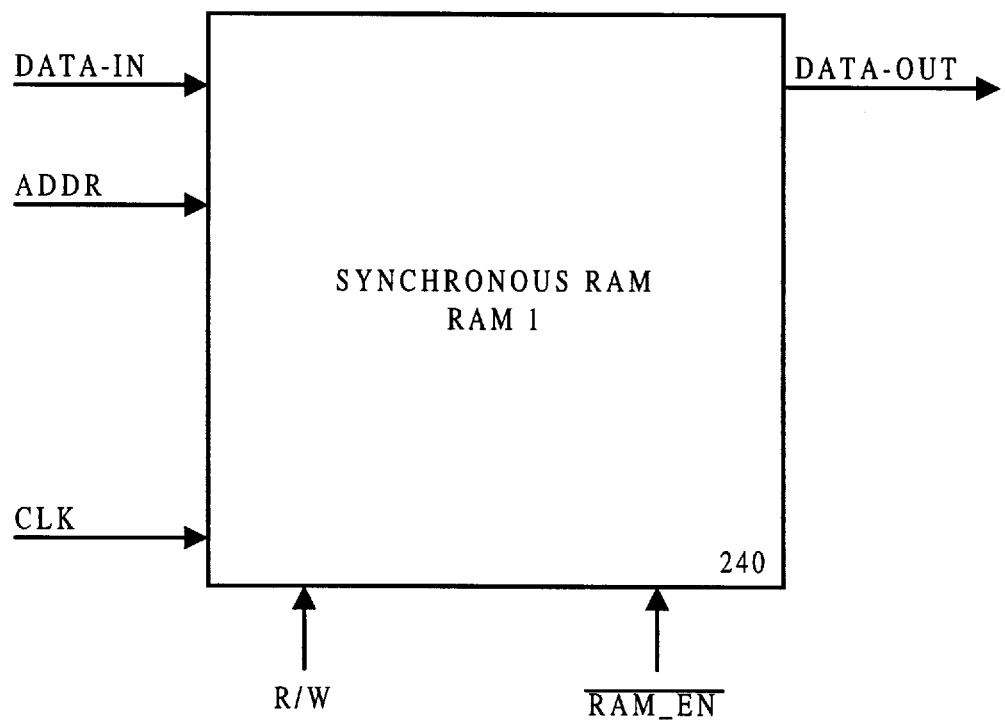
FIG. 6A illustrates a first exemplary synchronous RAM cell having different power consumption functions depending on the state of its input signals.

The following are examples of the state dependent power modeling structure of the present invention for synchronous RAM library cells. FIG. 6A illustrates a logical block diagram of the exemplary synchronous RAM library cell 240, RAM1, having a data input bus (DATA_IN), a data output bus (DATA_OUT), a single read/write signal (R/W), a RAM enable signal (RAM_EN), and address bus (ADDR), and a clock input (CLK).

Synchronous RAM - State Dependent Power Model
Example One

```
library(internal_power_example) {
    power_lut template(input_by_trans) {
        variable_1 : input_transition_time;
        index_1("0.0, 1.0, 2.0");
    }
    type (bus16) {
        base_type : array;
        data_type : bit;
        bit_width : 16;
        bit_from : 0;
        bit_to : 15;
    }
    type (bus8) {
        base_type : array;
        data_type : bit;
        bit_width : 8;
        bit_from : 0;
        bit_to : 7;
    }
    ...
    cell(RAM1) {
        bus(DATA_OUT) {
            bus_type : bus16;
            direction : output;
            ...
        }
        bus(DATA_IN) {
            bus_type : bus16;
            direction : input;
            ...
        }
        bus(ADDR) {
            bus_type : bus8;
            direction : input;
        }
        pin(R_W) {
            direction : input;
            ...
        }
        pin(RAM_EN) {
            direction : input;
            ...
        }
        pin(CLK) {
            direction : input;
            internal_power( ) {
                when : "R_W * RAM_EN";
```

Synchronous RAM - State Dependent Power Model
Example One

```
                power(input_by_trans) {
                    values("1.5, 2.5, 4.7");
                }
            }
            internal_power( ) {
                when : "R_W' & RAM_EN'";
                power(input_by_trans) {
                    values("1.8, 2.8, 5.1");
                }
            }
            internal_power( ) {
                when : "RAM_EN";
                power(input_by_trans) {
                    values("0.5, 0.8, 1.6");
                }
            }
        }
    }
}
```

In the above first exemplary power model structure of the synchronous RAM cell, three internal power groups are defined for a clock transition (designated signal CLK). These three internal power groups provide three when clauses. As shown by the second internal power group, RAM cell 240 consumes the most power during a write state when RAM_EN (asserted low) is enabled. This state is represented by the when clause function, (R_W'* RAM_EN'), where (') represents the inverse. During the read cycle, less power is consumed, as represented by the when clause, (R_W*RAM_EN') of the first internal power group. RAM cell 240 consumes the least power when it is not enabled, as shown by the when clause (RAM_EN) of the third internal power group. It is appreciated that no default internal power group is included in the above example because (1) the designated signal, CLK, is an input signal and also because (2) all input states are exhaustively included for the R_W, and RAM_EN signals. It is appreciated that the LUT, input_by_trans, is also defined in the above exemplary power model structure.

Figure 6B:
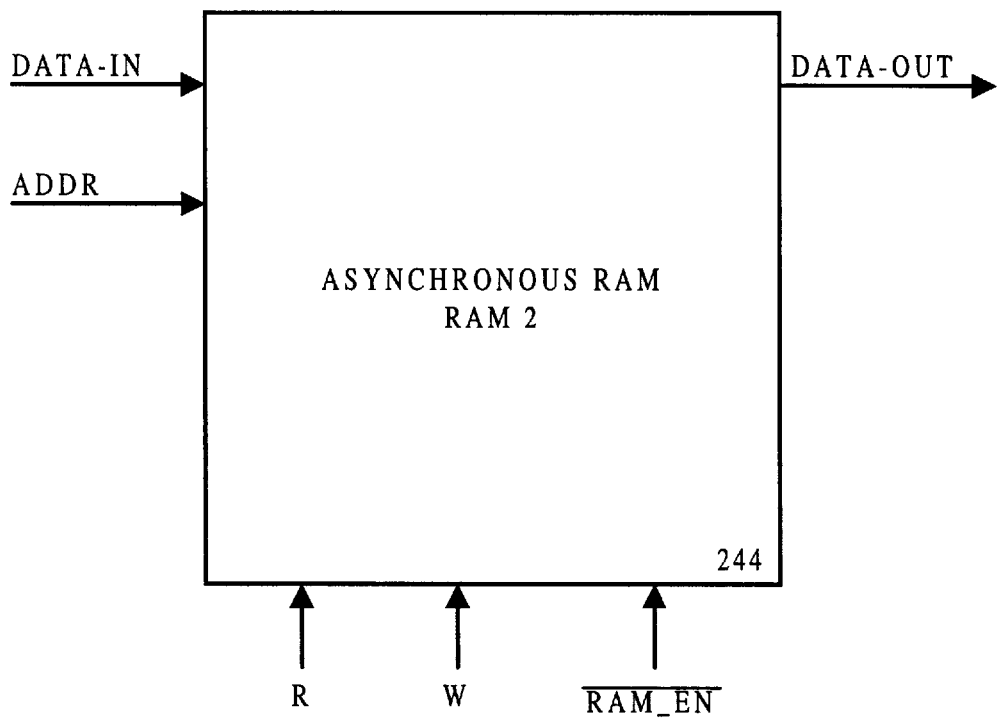
FIG. 6B illustrates a second exemplary asynchronous RAM cell having different power consumption functions depending on the state of its input signals.

In the following second RAM example, an asynchronous RAM cell is used. The RAM cell 240 of FIG. 6A is modeled except for the following modifications: (1) the single R_W line used in FIG. 6B is replaced by two individual signals, a read (R) signal and a separate write (W) signal; and (2) the clock signal, CLK, is removed. The resultant RAM cell 244, RAM2, is shown in FIG. 6B.

Asynchronous RAM - State Dependent Power Model
Example Two

```
library(internal_power_example) {
    power_lut_template(input_by_trans) {
        variable_1 : input_transition_time;
        index_1("0.0, 1.0, 2.0");
    }
    type (bus16) {
        base_type : array;
        data_type : bit;
        bit_width : 16;
        bit_from : 0;
        bit_to : 15;
    }
    type (bus8) {
        base_type : array;
        data_type : bit;
        bit_width : 8;
```

```
                Asynchronous RAM - State Dependent Power Model
                               Example Two bit_from : 0;
            bit_to : 7;
        }
        ...
    cell(RAM1) {
        bus(DATA_OUT) {
            bus_type : bus16;
            direction : output;
            ...
        }
        bus(DATA_IN) {
            bus_type : bus16;
            direction : input;
            ...
        }
        bus(ADDR) {
            bus_type : bus8;
            direction : input;
        }
        pin(R) {
            direction : input;
            internal_power( ) {
                when : "RAM_EN'";
                power(input_by_trans) {
                    values("1.5, 2.5, 4.7");
                }
            }
            internal_power( ) {
                when : "RAM_EN";
                power(input_by_trans) {
                    values("0.5, 0.8, 1.6");
                }
            }
            ...
        }
        pin(W) {
            direction : input:
            internal_power( ) {
                when : "RAM_EN'";
                power(input_by_trans) {
                    values("1.8, 2.8, 5.1");
                }
            }
            internal_power( ) {
                when : "RAM_EN";
                power(input_by_trans) {
                    values("0.5, 0.8, 1.6");
                }
            }
            ...
        }
        pin(RAM_EN) {
            direction : input;
            ...
        }
    }
}
```

In the above second exemplary asynchronous power model structure of RAM cell, two internal power groups are defined for a read signal transition (signal R), including two when clauses, one for the RAM cell 244 enabled and for when disabled. As shown, RAM cell 244 of FIG. 6B consumes most power during a read state when RAM_EN (asserted low) is enabled. This state, for the R pin transition, is represented by the when clause function, (RAM_EN') of the first internal power group for designated pin, R. Two internal power groups are also defined for a write signal transition (signal W), including two when clauses, one for RAM cell 244 being enabled and one for RAM cell 244 being disabled. As shown, RAM cell 244 of FIG. 6B consumes the most power during a write state when RAM_EN (asserted low) is enabled. This state, for the W pin transition, is represented by the when clause function, (RAM_EN') of the first internal power group of the signal, W. As between the power models for the read and write cycles, the most power is consumed by RAM cell 244 during the enabled write cycle. The power function for this case is (1.8, 2.8, 5.1). The least power dissipated during a read or write cycle is when RAM cell 244 is not enabled, as represented by the second internal power groups of signals R and W. Again, no default internal power groups are included in the above exemplary power model because the states are exhaustively listed by the when clauses. It is appreciated that the LUT, input_by_trans, is also defined in the above exemplary power model structure.

State-Dependent Leakage Power

The present invention allows the definition of leakage power values which are dependent upon the state of the library cell. The present invention includes an additional state-dependent leakage power group to represent the above leakage power. For cells with state-dependent leakage power, the designation "leakage_power ()" is used. As is the case with state dependent internal power, the present invention requires a default which will be the cell_leakage_power designation. In one embodiment, library compilers require that the name of the leakage variable and state dependent leakage power group be different. An exemplary format for the state-dependent leakage power group is:

```
            leakage_power( ) {
                when : <logical condition>;
                value : <value>;
            }
```

This format is consistent with the state dependent internal power format shown above. Both use the when clause to specify state dependency and require that the when conditions are mutually exclusive. An example of the use of state dependent leakage power is as follows:

```
            cell(mycell) {
                ...
                leakage_power( ) {
                    when : "!A";
                    value : 2.0;
                }
                cell_leakage_power : 3.0;
            }
```

III. PATH DEPENDENT POWER MODELING

The present invention provides a path dependent library cell model for the power consumption of a particular pin of a library cell that depends on the path taken of an input pin signal causing the transition, e.g., power consumption is determined for a power event based on which library cell's pin transitioned (e.g., source pin) to cause another library cell's pin to transition (e.g., destination pin). This path dependent model of the present invention is particularly advantageous for library cells whose actual power consumption varies depending on which input signal transitioned to cause the power event. The source pins can be either an input, output, internal or bidirectional pin while the destination pin can be an output, internal, or bidirectional pin within the path dependent power model of the present invention.

Figure 7:
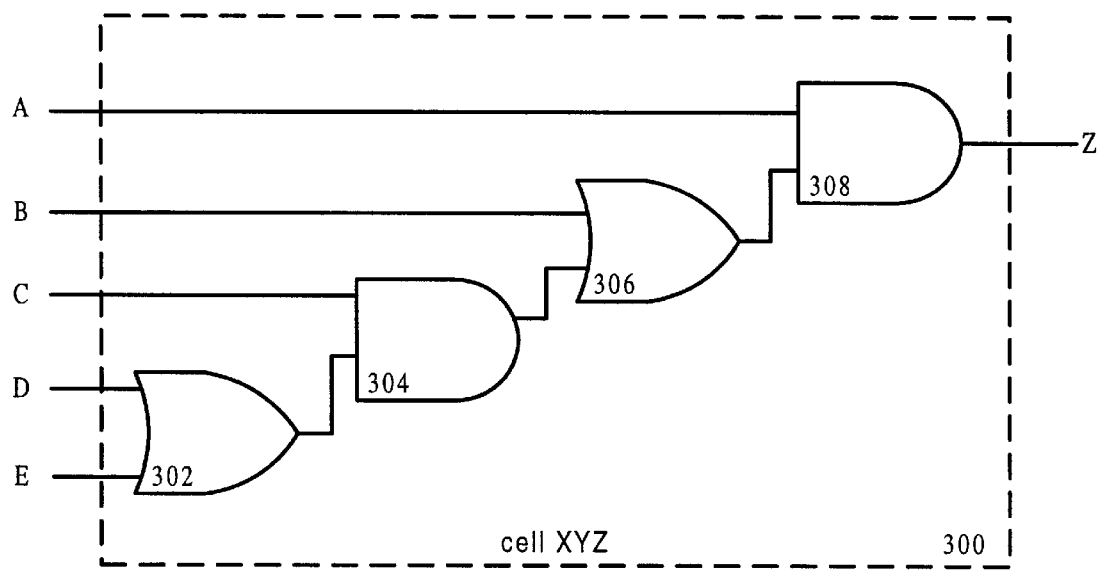
FIG. 7 illustrates an exemplary library cell having different power consumption functions depending on which input pin path transitioned to cause the power event.

For instance, with reference to the exemplary library cell 300 of FIG. 7 having gates 302 to 308, a transition in input A causing the output Z to transition involves only gate 308. However, a transition in signals D and E causing output Z to transition involves gates 302 through 308, consuming much more power than the former event. The present invention path dependent power modeling allows a library developer to specify a power consumption model for a library cell, e.g., cell 300, based on transition of particular input signal pins.

Figure 8:
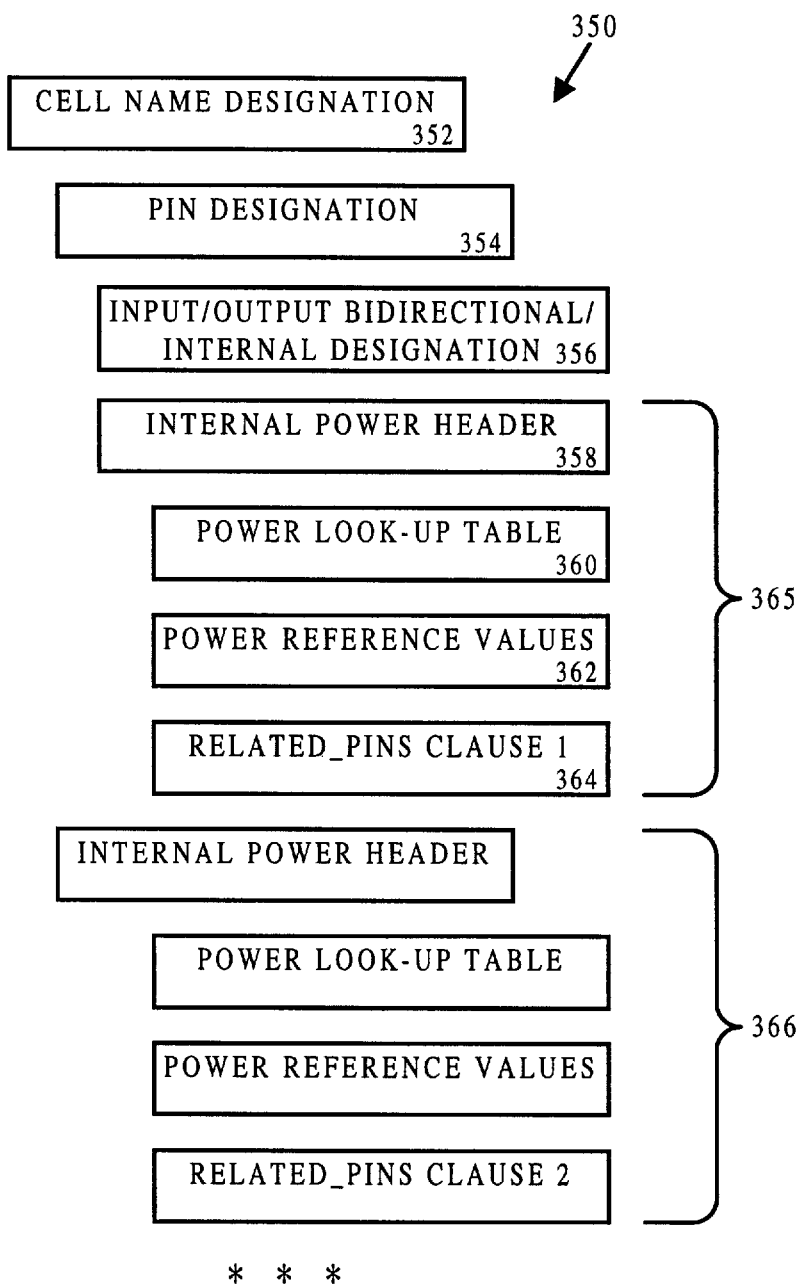
FIG. 8 illustrates a generic path dependent power modeling structure in accordance with one embodiment of the present invention.

FIG. 8 illustrates a generic data structure 350 utilized within the context of the present invention path dependent model to represent power consumption within a logic cell. The structure 350 of the power model for path dependent power modeling is similar to the structure 250 (FIG. 4) of state dependent power modeling except that the when clause is replaced by a "related_pins" clause used for path dependent power modeling of the present invention. Data structure 350 resides within computer readable memory units of system 112 (FIG. 3) and is accessed by processor 101 during power analysis. The particular logic cell is identified by a cell name designation (data field) 352. A cell library includes many logic cell power models 350, one for each distinct cell supported by the technology specific library. For each pin of the designated cell whose transition causes a power consumption event, the present invention data structure 350 allows a library cell developer to specify (1) a set of certain library pins and (2) the power consumed by the logic cell when any pin of those set of certain library pins transitions causing a transition over the designated pin. FIG. 8 illustrates power consumption information for one pin of the designated cell; this designated pin is identified by the pin designation field 354. It is appreciated that one pin is shown for clarity only and that structure 350 can contain analogous definitions for multiple pins of the designated cell.

The designated pin can be either an output, bi-directional, or internal pin of the designated cell. For each pin designation, structure 350 contains an identification of whether that pin is an output pin, an internal pin, or a bidirectional pin. Within the context of the path dependent power model of the present invention, the terms "input pin" and "output pin" each can encompass the definition of an "internal pin" and/or a "bidirectional pin" when used, respectively, to input a signal to a cell's element or used to output a signal from a cell's element. An element is any sub-partition of a library cell. This designation is shown as the output/internal/bidirectional designation 356. Typically with respect to path dependent power modeling, this designation 356 is "output" as output pins are generally path dependent modeled. For each pin designation 354, structure 350 contains one or more internal power headers indicating that power modeling information is to follow regarding the designated pin. The power modeling information for an internal power header is contained within an internal power group 365.

Within each internal power group 365 of the structure 350 of FIG. 8, the present invention contains an identification designation 360 of a power look-up table used in determining the power consumption for the designated cell. Also within each internal power group 365 of structure 350, the present invention contains a list of power reference values 362 for use in conjunction with the designated power look-up table 360 for determining the power consumption for the designated cell. Also included within each internal power header 358 is a "related_pins" clause 364 indicating the set of pins relevant to this internal power group 365. The related pins clause 364 can contain input, output, bidirectional and internal pins. Within one embodiment of the present invention, the related_pins clause 364 typically contains a list of selected input pins. If a transition, regardless of its state, over one or more of the set of pins listed in 364 causes a transition over the designated pin 354 of this library cell 352, then the power consumed by the library cell is determined by the designated power reference values 362 of the relevant internal power group 365. Although shown as at the end of an internal power group, the related_pins clause 364 can be positioned at any place within the internal power group after the power header within the scope of the present invention. Within one embodiment of the path dependent power modeling, for a particular designated pin, each input of the designated library cell is required to be exhaustively specified within its internal power groups.

During power analysis, if a transition is recorded over any of the pins identified at 364 causing a transition over the designated pin 354, then the power information designed within 360 and 362 is used to determine the power consumed by the logic cell designed by 352 based on a given input signal transition time and/or an input output capacitance value associated with the power event and the designated cell.

As shown in FIG. 8, a particular pin can have more than one internal power group. The designated pin of FIG. 8 contains two internal power groups 365 and 366. The internal power group 366 contains a different "related_pins" clause for the designated pin. It is appreciated that the pin listings of each "related_pins" clause for a designated pin are typically mutually exclusive within the preferred embodiment the present invention. The present invention path dependent data structure 350 does not need to include a default internal power group for the designated pin because, for a given designated pin, a default condition can readily be represented by an additional related_pins clause including all pins not otherwise listed in a prior internal power group. Alternatively, the present invention can also include a specific default power consumption function (and power LUT) of an explicit default internal power group, as done in the state dependent power modeling. This default internal power group of this alternative embodiment would not include a related_pins designation and its reference power values would apply for all input pins not already defined for a particular pin designation.

Although a number of different programming and data structure languages can be used to implement the specifics of the generic outline of FIG. 8, one exemplary power model structure of the path dependent power modeling of the present invention is described below. The exemplary power model is representative of the exemplary cell 300 shown in FIG. 7. The LUT, output_by_cap_and_trans is a two dimensional LUT because it contains two input indices, however, one or three dimensional LUTs are equally well suited for application with the path dependent structure shown below. The LUT contains reference index values and its structures are shown following the exemplary power model structure.

---

Exemplary Path Dependent Power Model Structure

```
cell(mycell) {
    pin(A) {
        direction : input;
        ...
    }
    pin(B) {
        direction : input;
        ...
    }
```

```
            pin(C) {
                direction : input;
                ...
            }
            pin(D) {
                direction : input;
                ...
            }
            pin(E) {
                direction : input;
                ...
            }
            pin(Z) {
                direction : output;
                internal_power ( ) {
                    power(output_by_cap_and_trans) {
                        values("2.2, 3.7, 4.3", "1.7, 2.1, 3.5", "1.0, 1.5, 2.8");
                    }
                    related_pin : "D E";
                }
                internal_power ( ) {
                    power(output_by_cap_and_trans) {
                        values("2.0, 3.5, 4.1", "1.5, 1.9, 3.3", "0.8, 1.3, 2.6");
                    }
                    related_pin : "C";
                }
                internal_power ( ) {
                    power(output_by_cap_and_trans) {
                        values("1.8, 3.3, 3.9", "1.3, 1.7, 3.1", "0.6, 1.1, 2.4");
                    }
                    related_pin : "B";
                }
                internal_power ( ) {
                    power(output_by_cap_and_trans) {
                        values("1.6, 3.1, 3.7", "1.1, 1.5, 2.9", "0.4, 0.9, 2.2");
                    }
                    related_pin : "A";
                }
            }
        }

Output_by_Cap_and_Trans LUT library(internal_power_example) {
            power_lut_template(output_by_cap_and_trans) {
                variable_1 : total_output_net_capacitance;
                variable_2 : input_transition_time;
                index_1("0.0, 5.0, 20.0");
                index_2("0.0, 1.0, 2.0");
            }
        }
```

With reference to the above example and to FIG. 7, the designated pin, Z, contains four separate internal power groups. A transition over output pin Z can cause cell 300 to exhibit four different power consumption functions, represented by four internal power groups, depending on which input signal pin group caused the signal transition over pin Z. If a transition over pin D or E caused the power event, then the largest power consumption function, ("2.2, 3.7, 4.3", "1.7, 2.1, 3.5", "1.0, 1.5, 2.8"), is used by the first internal power group to compute the estimated power for cell 300. This represents the longest path between the input pins and pin Z, the output pin. If a transition over pin C caused the power event, then the second largest power consumption function, ("2.0, 3.5, 4.1", "1.5, 1.9, 3.3", "0.8, 1.3, 2.6"), is used by the second internal power group to compute the estimated power for cell 300. If a transition over pin B caused the power event, then the second smallest power consumption function, ("1.8, 3.3, 3.9", "1.3, 1.7, 3.1", "0.6, 1.1, 2.4"), is used by third internal power group to compute the estimated power for cell 300. Lastly, if a transition over pin A caused the power event, then the smallest power consumption function, ("1.6, 3.1, 3.7", "1.1, 1.5, 2.9", "0.4, 0.9, 2.2"), is used by the fourth internal power group to compute the estimated power for cell 300.

This last function represents the shortest path between the input pin and the output, Z. It is appreciated since LUT, output_by_cap_and_trans, is a two dimensional LUT indexed by both input signal transition time and output pin capacitance and further that three reference values are given for each index, this LUT requires 3×3 or 9 reference power values to fill its power function.

Path dependent power modeling definitions do not affect the other possible types of tables in an internal power group. Further, one, two, or three dimensional power tables can be used within path dependent power modeling. In one embodiment, when specifying path dependent power models, the library developer specifies a path between the output and each non-synchronous input to which it is functionally related. A library compiler checks this condition and the present invention issues an error if all paths are not specified. For a black box, the library compiler cannot determine which inputs are functionally related to a particular output, so it does not check that all paths are enumerated.

State and Path Dependent Modeling

Library models can be made within the present invention that include both a when clause and a related_pins clause to incorporate both path and state dependent modeling. The resulting structure is the same as shown in FIG. 8, but related_pins clause 364 includes an associated when clause. In this case, the resulting internal power group's power reference values 362 and power lookup table 360 defines the designated cell's power consumption only: (1) provided the state defined in the when clause exists contemporaneously with a transition over the designated pin and; provided further (2) a pin of the set of particular pins defined in the related_pins clause transitions causing the designated pin to transition.

Output-to-Output Path Dependent Power Modeling

In the present invention path dependent power modeling, the related_pins field can also refer to output pins on which a particular output is dependent. This advantageously allows the specification of multiple output cells to be easier using the present invention. For example, with reference to FIG. 9A, the specification of multiple outputs Z and Y is made easier with reference to cell 370 by allowing output Z to be dependent on output Y. In this embodiment, the present invention can be used by a library developer to create a path dependent internal power table for the path from A and B to output Y. The developer can also use the present invention path dependent power model to create a path-dependent internal power table for the path from Y to Z. This procedure is typically more intuitive to the library developer and is consistent with path dependent timing.

Figure 9A:
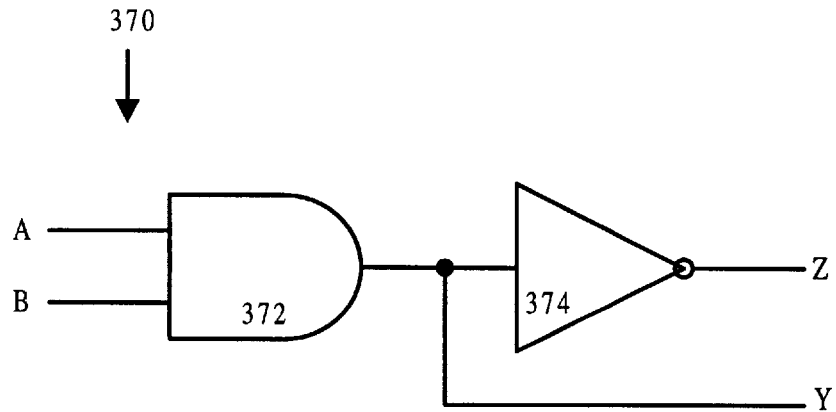
FIG. 9A is a schematic diagram of an exemplary library cell having two output signals that switch contemporaneously and are opposite.
Figure 9B:
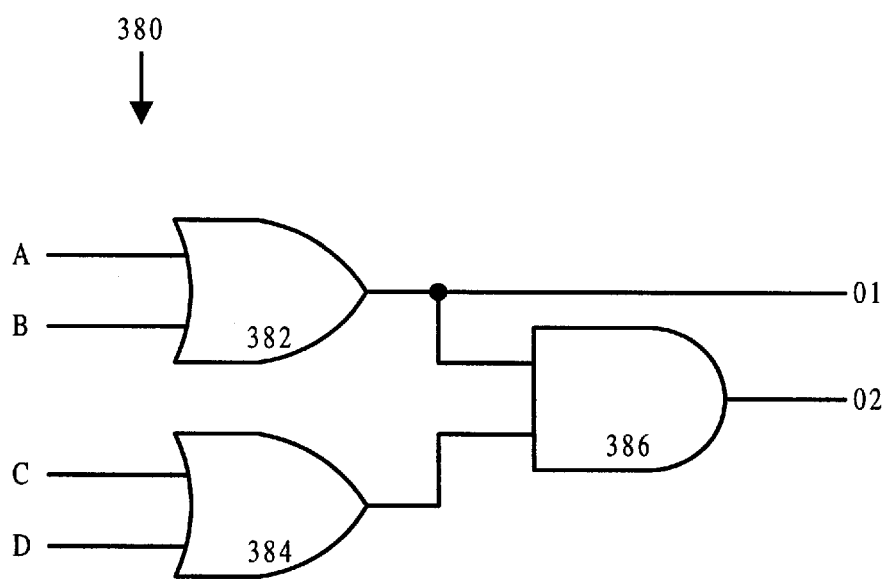
FIG. 9B is a schematic diagram of an exemplary library cell having output signals that may transition independently of each other.

Within this aspect of the present invention, the library developer should specify output-to-output power using path dependent power tables only if both outputs are functionally equal or opposite. In this case, a library compiler typically checks that the functions on the output pins are either functionally equivalent or have an inverse relationship. An error is issued if this is not the case. For this path dependent use, the present invention requires that both outputs of the path be functionally equal or opposite to reduce the complexity for simulators and power analysis. In FIG. 9A, Y and Z are functionally equal or opposite, so output-to-output path dependent power tables of the present invention can be used. However, for the circuit 380 of FIG. 9B it is not appropriate to use output-to-output path dependent power tables because O1 and O2 are independent, e.g., they are not functionally equal or opposite.

In one embodiment of the present invention, output-to-output paths are not allowed for "black-box" library cells because the present invention cannot readily verify that the outputs are functionally equal or opposite.

IV. THREE DIMENSIONAL POWER TABLE FOR POWER MODELING

Figure 10:
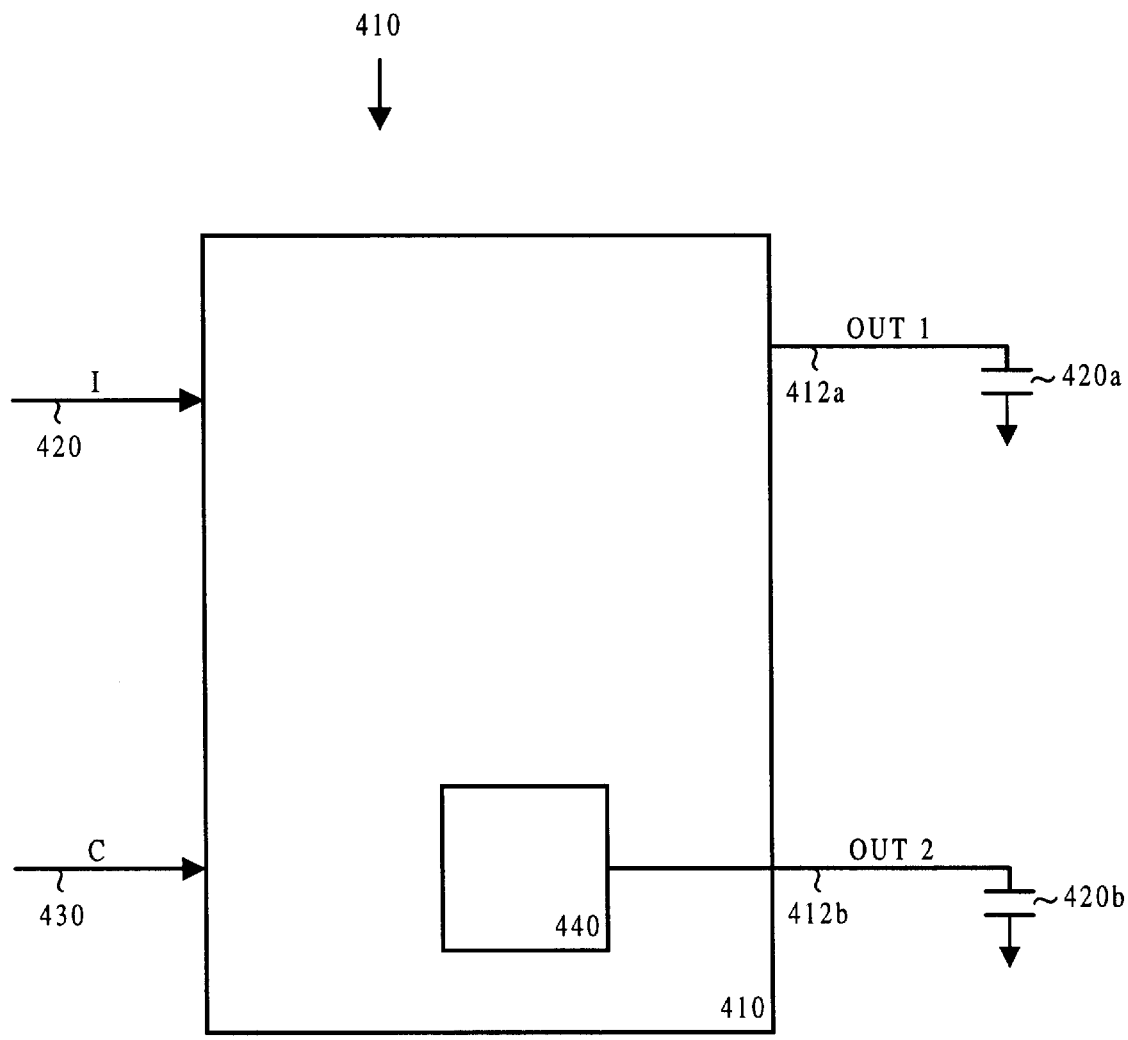
FIG. 10 illustrates an exemplary library cell having two outputs that switch contemporaneously.

The present invention provides a power table having three indices for representing the power consumed within a library cell having two outputs that switch contemporaneously. Often this situation is seen in a library cell wherein the outputs are equal or opposite, e.g., Q and Q' (inverse) of a flip-flop circuit. FIG. 10 illustrates an exemplary library cell 410 having two outputs 412a and 412b that switch contemporaneously. Within the context of the three dimensional power table of the present invention, "contemporaneously" means simultaneously or as the result of a common signal or set of signals causing the transitions to occur close in time. The cell 410 receives input signal(s), I, 420 and also receives a clock signal, C, 430. General circuitry of cell 410 controls output 412a and other circuitry 440 controls the state of the other output 412b. It is often the case that library developers are not knowledgeable of the specific circuitry components within circuit 440, or the circuitry that controls output 412a, because in certain characterization procedures, the developers characterize their cells as "black boxes." This practice, in conjunction with the fact that the outputs 412a and 412b switch contemporaneously, make estimating the power consumption of cell 410 difficult within a prior art power model that requires: (1) power consumption characterization be related to an output pin; and (2) that only one power table is allowed for each output pin so characterized.

For defining the power consumption of the library cell 410 as a whole, the present invention solves the above problem by allowing a library developer to define two output capacitance load values, one for each output 412a and 412b, in addition to the input transition time. By taking into consideration both of the output load capacitance values 420a and 420b, the present invention power table provides a very accurate and efficient method by which to estimate the power consumption for library cell 410 based on an output signal transition without requiring the library developer to be knowledgeable regarding the specific circuitry controlling each output.

Figure 11:
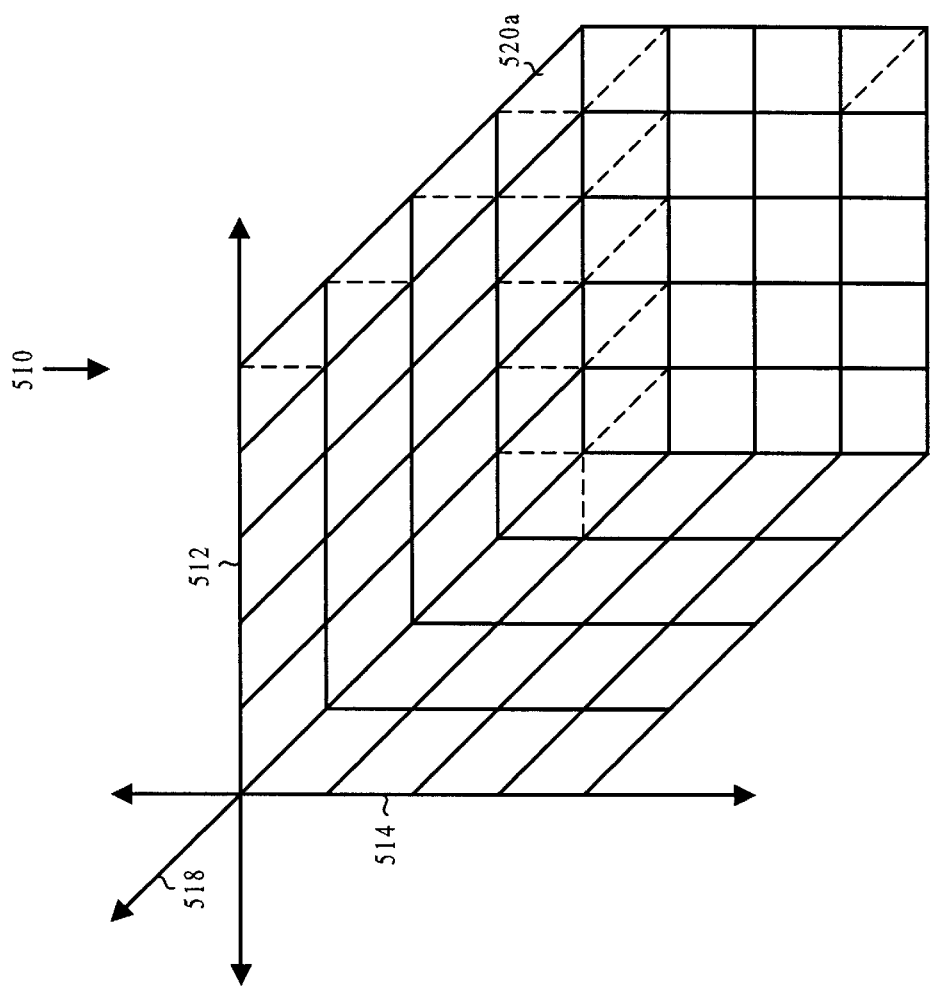
FIG. 11 illustrates a three dimensional power lookup table (3-D power LUT) having dual output load capacitance indices used in accordance with the present invention.

In order to represent both output load transitions, the present invention provides a three dimensional power table 510, as shown in FIG. 11. The power table 510 includes a three dimensional matrix of cells (one example cell is 520a). Although the matrix can be of a number of different sizes within the present invention, a matrix exemplary size of 4×4×5 or 100 entries is shown in FIG. 11. Multiple reference values for the first output load capacitance (e.g., 420a) associated with output 412a are placed along axis 512. Multiple reference values for the second output load capacitance (e.g., 420b) associated with output 412b are placed along axis 514. Lastly, multiple reference values for the input signal transition time of input 420 are placed along the third axis 518. Values within each of the matrix cells then represent reference power values associated with their respective coordinate position defined by the three indices, e.g., output1 load capacitance, output2 load capacitance, and input transition time. It is appreciated that the above three axis definitions can be re-arranged without departing from the scope of the present invention.

In one embodiment, the present invention provides the matrix 510 in the form of a power look-up table having three indices and one output value. For a matrix power table size of N×M×P, there are N*M*P reference power values required to fill the three dimensional look-up table (3-D LUT). It is appreciated that the 3-D LUT of the present invention resides within computer readable memory of system 112 (FIG. 3) and is accessed by processor 101 in during power analysis. The reference power values placed within the cells of the matrix 510 represent amounts of physical power consumed by library cells which represent physical circuitry within an integrated circuit device. The present invention 3-D LUT is advantageous because library developers can readily supply the required reference power values since combinations of input transition times and first and second output capacitance values are straightforward to measure.

In operation, the cells of the 3-D LUT 510 (FIG. 11) of the present invention are filled with N*M*P reference power values by a particular power model for a library cell, e.g. from the values of designation 262 (FIG. 4) or designation 362 (FIG. 8). Then, during power analysis, the 3-D LUT is presented with a particular input coordinate having: (1) a particular input transition time; (2) a particular output load capacitance value for output1; and (3) a particular output load capacitance value for output2. The input coordinate is supplied when both outputs switch contemporaneously. Using well known three dimensional linear (or non-linear) interpolation mechanisms, the present invention uses the above input coordinate and the reference index and power values to arrive at an output power value corresponding to the input coordinate.

It is appreciated that the 3-D LUT of the present invention having dual reference indices, representing two different output load capacitance values, can be used in conjunction with the above state dependent power models and path dependent power models. An example of the above is presented herein.

It is further appreciated that the present invention 3-D LUT is valid when two outputs are functionally equal or opposite. Within the present invention, if either of the outputs of a library cell can switch independently, library developers can also specify other power tables for the cases that the output switch independently (e.g., a 2-dimensional power table only based on input transition time and that output's load capacitance). In this case, the present invention allows a library developer to specify a when clause in the internal power group with the 3-D LUT if these outputs are not always functionally equal or opposite. The when clause is the Boolean expression for the condition that these outputs are functionally equal or opposite. If a user specifies only a 3-D LUT for outputs which are not equal or opposite, a library compiler issues an error. However, within the present invention, the library developer does not need to specify a when clause if both outputs are always functionally equal or opposite.

Figure 12A:
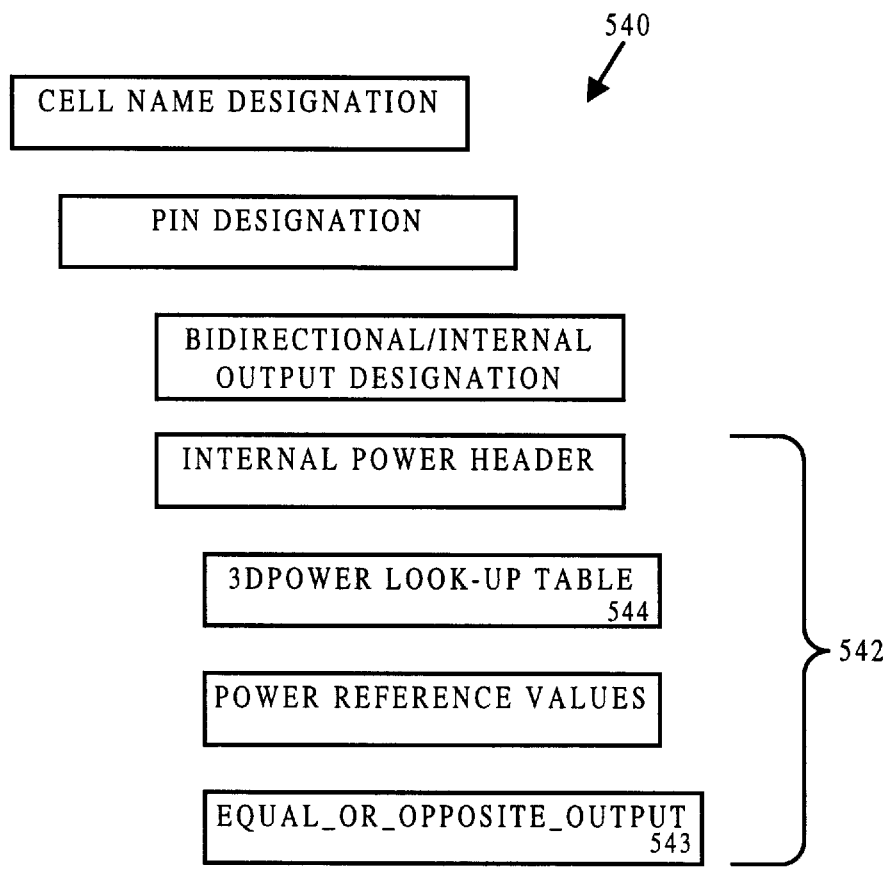
FIG. 12A is a generic data structure for an internal power group using a 3-D LUT of the present invention.
Figure 12B:
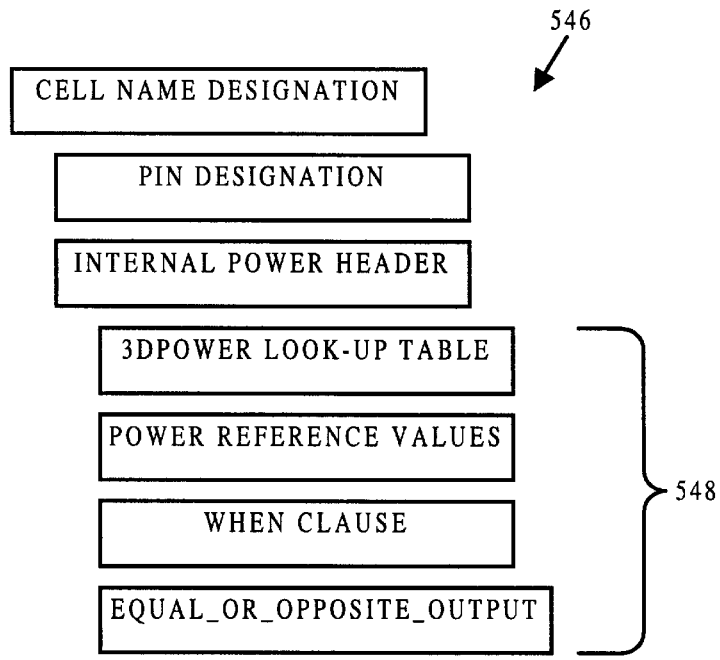
FIG. 12B is a generic data structure for an internal power group using both a 3-D LUT and state dependent modeling in accordance with the present invention.
Figure 12C:
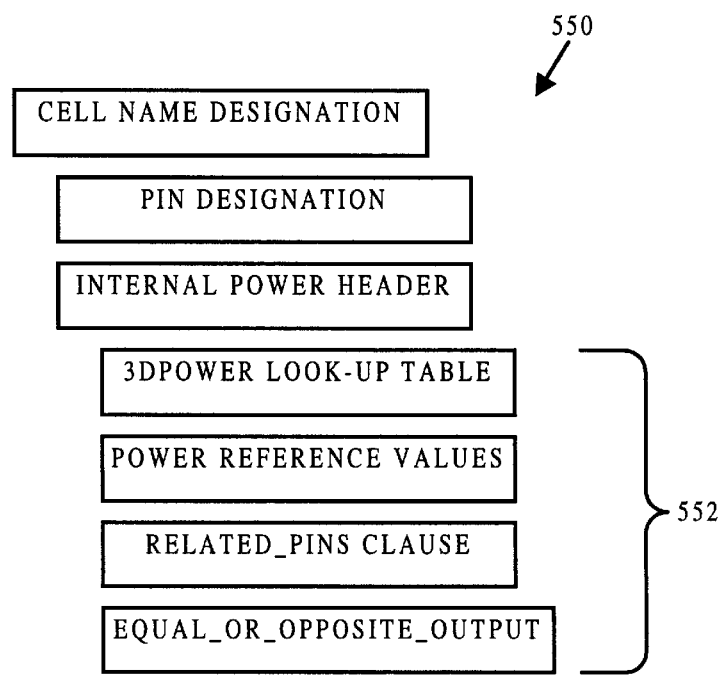
FIG. 12C is a generic data structure for an internal power group using both a 3-D LUT and path dependent modeling in accordance with the present invention.
Figure 12D:
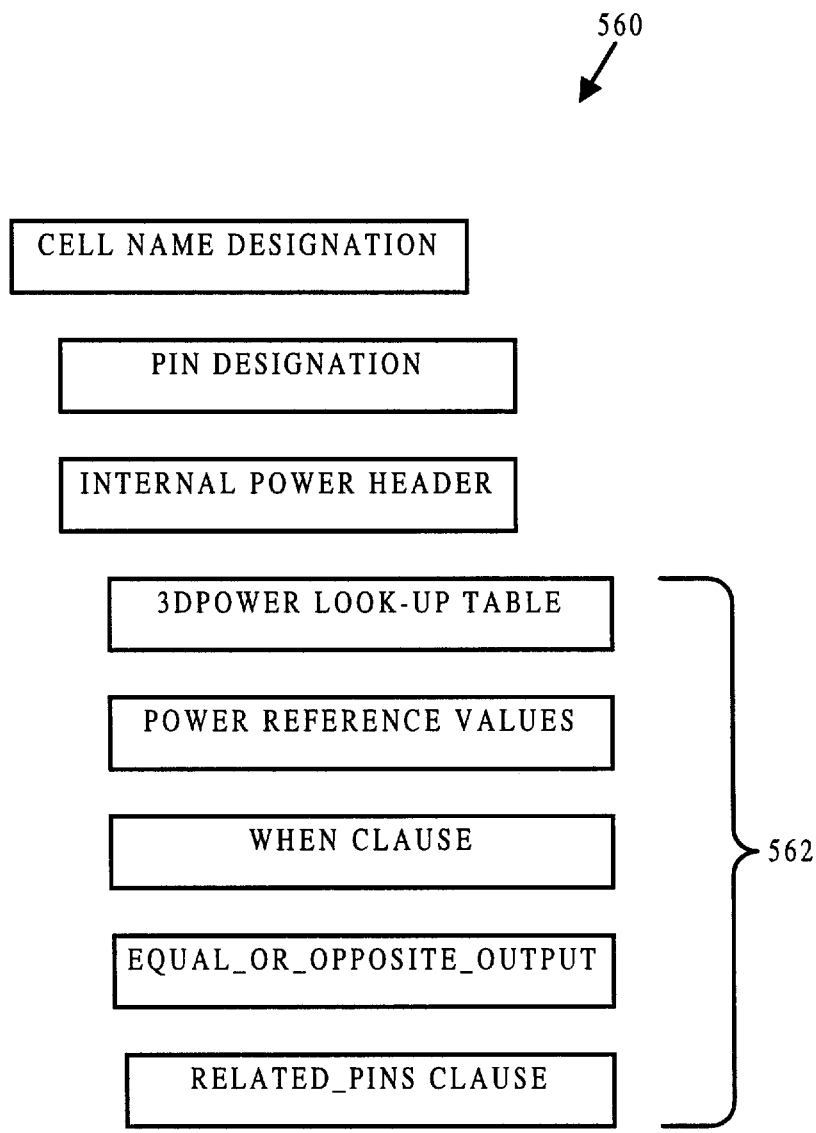
FIG. 12D is a generic data structure for an internal power group using a 3-D LUT and both state and path dependent modeling in accordance with the present invention.

The internal power group which holds the 3-D LUT is differentiated from other internal power groups by the field "equal_or_opposite_output," although other names can be used without departing from the present invention. An example of this data structure 540 (stored in computer readable memory units of system 112) for a single internal power group 542 is shown in FIG. 12A having an "equal_or_opposite_output" designation 543 and a 3-D power LUT designation 544. The internal power group 542 represents the total power consumption for the represented library cell for both modeled outputs. FIG. 12B illustrates an exemplary data structure 546 having an internal power group 548 including both a 3-D power LUT and a when clause for state dependent power modeling. FIG. 12C illustrates an exemplary data structure 550 having an internal power group 552 including both a 3-D power LUT and a related pins clause for path dependent power modeling. Lastly, FIG. 12D illustrates an exemplary data structure 560 having an internal power group 562 including a 3-D power LUT, a related pins clause for path dependent power modeling, and a when clause for state dependent power modeling.

The present invention also checks that the equal_or_opposite_output designation contains an output, bidirectional, or internal pin. An error is issued if a 3-D LUT is specified without a when clause and the two outputs have neither a functionally equivalent nor a inverse relationship. The error indicates to the user that these outputs do not always switch contemporaneously, so the user needs to add a when clause in that internal power group and specify additional power lookup tables for each output for cases when these outputs switch independently.

Although different syntax can be used without departing from the present invention, the names of the input values passed to the 3-D power table for the outputs' capacitive loads are total_output_net_capacitance and total_other_output_net_capacitance. An example of a library with 3-dimensional power lookup tables is given below. This example relates to a flip-flop library cell 530 shown in FIG. 13 having a set input (S), a reset input (R), a D input, a clock (CP) input and a Q output and a Q' or (QN) inverse output. The 3-D LUT 510 of this example is a N×N×N LUT wherein N=3. Therefore, 27 reference power cells are required to fill the 3-D power LUT.

Example of 3-D Power Table

```
library(internal_power_example) {
    power_lut_template(output_by_cap1_cap2_and_trans) {
        variable_1 : total_output_net_capacitance,     *** inputs ***
        variable_2 : total_other_output_net_capacitance;
        variable_3 : input_transition_time;
        index_1("0.0, 5.0, 20.0");                     *** index
        index_2("0.0, 5.0, 20.0");                     reference
        index_3("0.0, 1.0, 2.0");                      values ***
    }
    power_lut_template(output_by_cap_and_trans) {
        variable_1 : total_output_net_capacitance;
        variable_2 : input_transition_time;
        index_1("0 0, 5 0, 20.0");
        index_2("0.0, 1.0, 2.0");
    }
    power_lut_template(input_by_trans) {
        variable_1 : input_transition_time;
        index_1("0.0, 1.0, 2.0");
    }
    ...
    cell(FLOP1) {
        pin(CP) {
            direction : input;
            internal_power(input_by_trans) {
                power(input_by_trans) {
                    values("1.5, 2.5, 4.7");
                }
            }
        }
        ...
        }
        pin(D) {
            direction : input;
            ...
        }
        pin(S) {
            direction : input;
            ...
        }
```

Example of 3-D Power Table
-continued

```
        pin(R) {
            direction : input;
            ...
        }
        pin(Q) {
            direction : output;
            internal_power( ) {
                power(output_by_cap1_cap2_and_trans) {
                    values("2.2, 3.7, 4.3", "1.7, 2.1, 3.5", "1.0, 1.5, 2.8",\
                        "2.1, 3.6, 4.2", "1.6, 2.0, 3.4", "0.9, 1.5, 2.7",\
                        "2.0, 3.5, 4.1", "1.5, 1.9, 3.3", "0.8, 1.4, 2.6");
                }
                when : "S' or "R'";
                equal_or_opposite_output : "QN";
                related_pin : "CP";
            }
            internal_power( ) {
                power(output_by cap and_trans) {
                    values("1.8, 3.4, 4.0", "1.5, 1.9, 3.3", "0.8, 1.3, 2.5");
                }
                related_pin : "S R";
            }
            ...
        }
        pin(QN) {
            direction : output;
            internal_power( ) {
                power(output_by_cap_and_trans) {
                    values("0.5, 0.9, 1.3", "10.3, 0.7,1.1", "0.2, 0.5, 0.9");
                }
                related_pin : "S R";
            }
            ...
        }
        ...
    }
```

Figure 13:
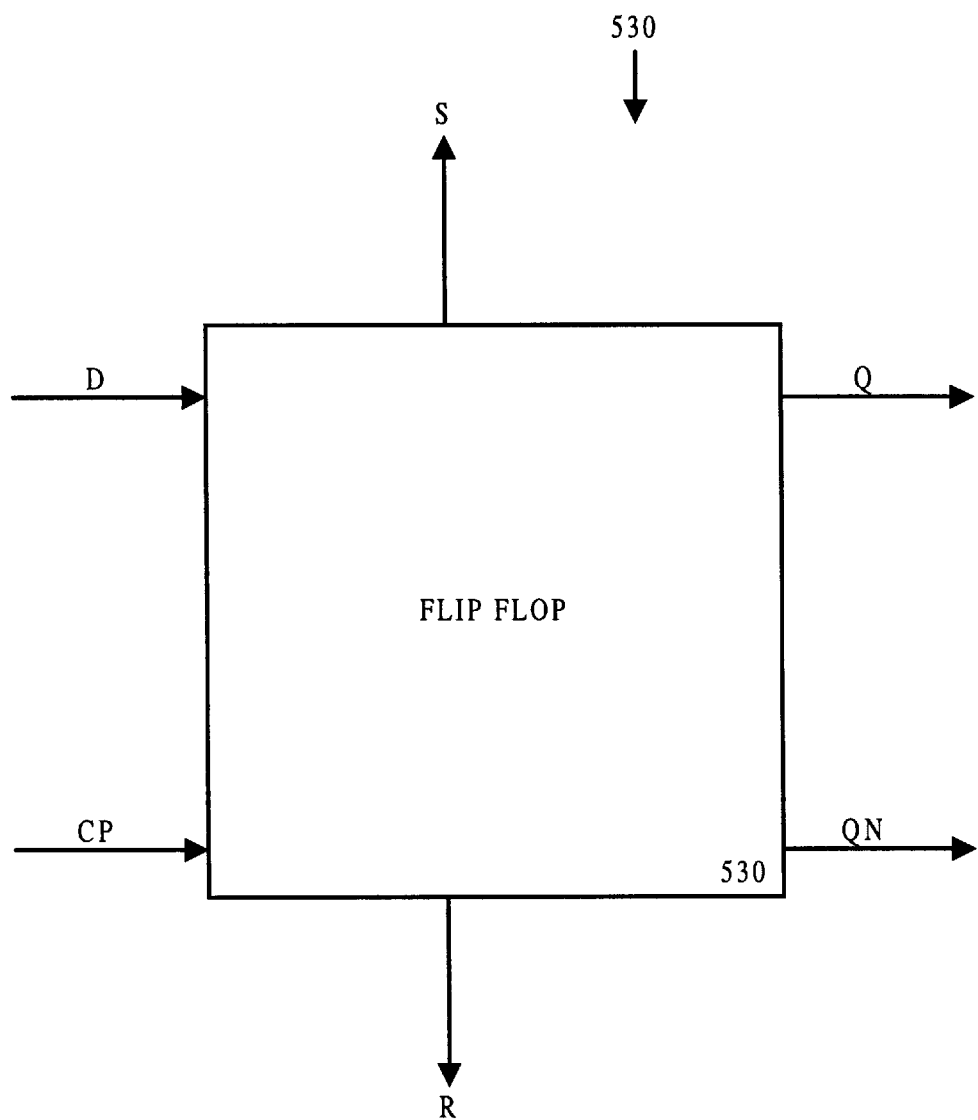
FIG. 13 is an exemplary flip flop library cell.

The above example specifies a 3-dimensional power table 510 in accordance with the present invention for the outputs Q and QN of FIG. 13, which switch contemporaneously, as well as a 2-dimensional power table for each output when the outputs switch independently. This is necessary for accuracy because output Q and output QN can switch contemporaneously or independently. This example uses the 3-dimensional power table 510 of the present invention in conjunction with both state and path dependent power modeling. If this example did not have set (S) and reset (R) input pins, only a 3-dimensional table would be required. In the example, two internal power groups are defined for the Q output pin and one internal power group is defined for the QN output pin.

If a library developer creates an internal power group with the field equal_or_opposite_output, that internal power group is required to contain a 3-dimensional power table in accordance with one embodiment of the present invention. A 2-dimensional power table which has as indices both outputs' capacitive loads should be avoided. Any definition of a LUT with only the indices total_output_net_capacitance and total_other_output_net_capacitance defined causes an error within the present invention.

Library Separate Rise and Fall Power Modeling

The present invention also allows rise and fall power to be separately modeled with reference to a library cell. The present invention uses rise_power and fall_power designations within internal power groups to represent this information. The present invention checks if a rising_power group is specified, then a falling_power group should also be specified in the same internal power group. An example of internal power groups where rise and fall power is specified separately is shown below.

```
internal_power( )
    rise_power(output_by_cap_and_trans) {
        values("2.2, 3.7, 4.3", "1.7, 2.1, 3.5", "1.0, 1.5, 2.8");
    }
    fall_power(output_by_cap_and_trans) {
        values("2.0, 3.5, 4.1", "1.5, 2.3, 3.3", "1.2, 1.3, 2.6");
    }
    related_pin : "A";
}
```

V. POWER ESTIMATION PROCESS

Figure 14:
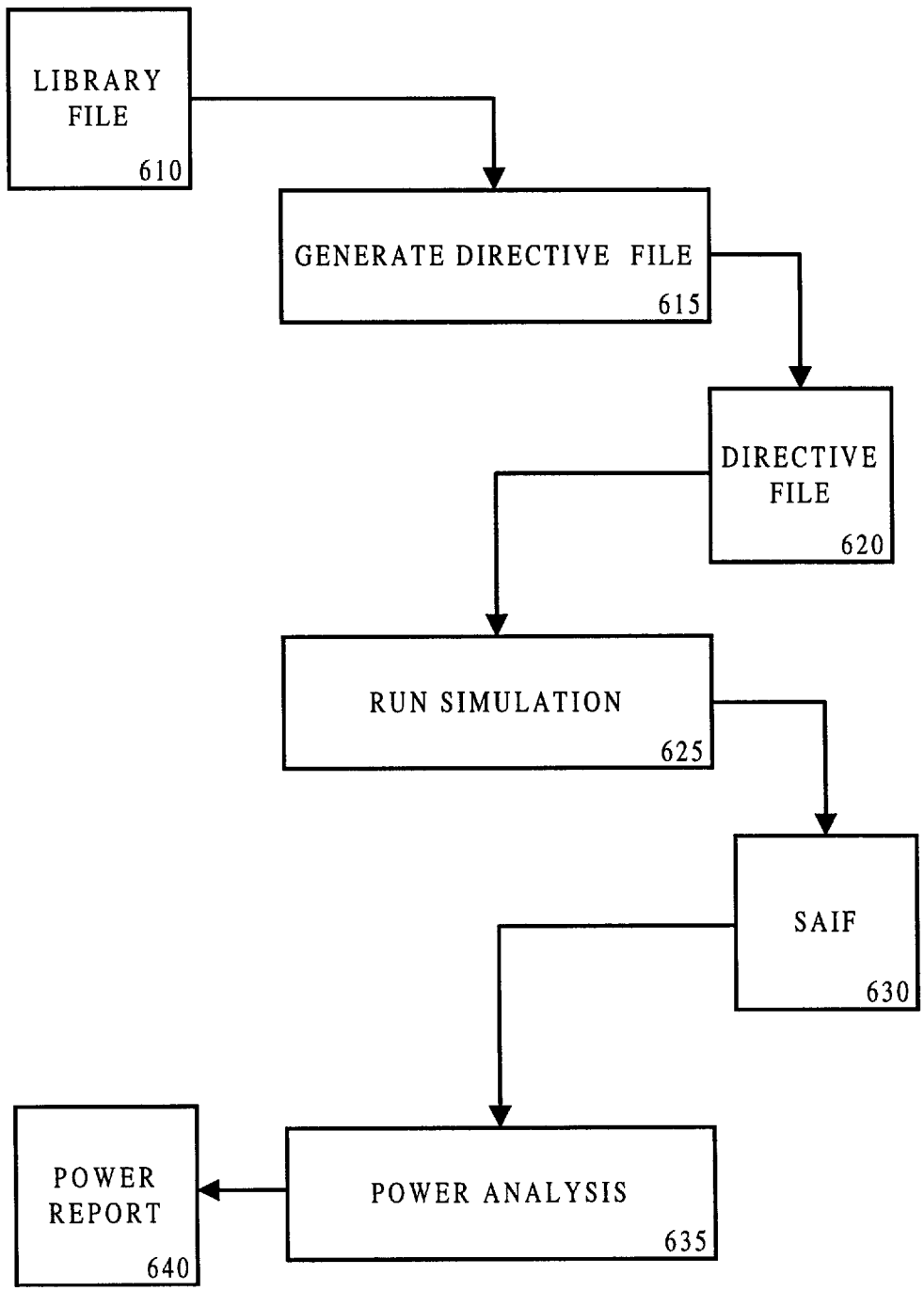
FIG. 14 is an overall flow chart of steps and data used within an exemplary embodiment of the power analysis processes of the present invention.

FIG. 14 illustrates an overall flow diagram 600 of steps and data files involved in a power estimation process in accordance with the present invention power modeling for an integrated circuit device. The steps of diagram 600 are implemented as program code stored in computer readable memory units of system 112 (FIG. 3) which are executed over processor 101. The data files used by process 600 are similarly stored in memory units of system 112. A library file 610 contains the power modeling structures of the present invention described above for various different library cells for the integrated circuit design. In the library file 610 are contained the state and path dependent power structures and any 3-D power tables (as described above) for specific library cells. This file 610 is read by a generate directive file process 615 which generates a directive file 620.

The simulator process 625 needs to be informed of which library cells have state and/or path dependent modeling so it can output the necessary information used to perform power estimation for these library cells. The simulator process 625 uses the directive file 620 to obtain this information. The directive file 620 contains a listing of specific signal states and transition paths that the simulator 625 is to watch out for, during simulation, that have an impact on power estimation. These states and transitions are defined within the power modeling structures used in the library file 610 for state and/or path dependent modeling. The directive file 620 is needed in part because the number of possible conditions encountered by the simulator 625 is too great to monitor without information used to direct or focus the simulator's recording activity.

For example, assuming a state dependent power model for library cell, mycell, has a particular power function defined when output O transitions and inputs A, B, and C are all 1 (e.g., state condition A AND B AND C). In this case, the directive file 620 contains information informing the simulation process 625 to record a count value each time mycell has an output O that transitions and A, B and C are 1. During simulation, this case is watched for and a record is made each time it happens.

During simulation 625, a separate record or tally is made of each occurrence of each condition outlined in the directive file 620 and the totals are aggregated over the simulation interval. Simulation process 625 maintains this record in computer readable memory units of system 112 in a switching activity interchange format (SAIF) file 630 which indicates the number of times each event in the directive file 620 occurred over the time interval of the simulation for each library cell. This information includes input transition times for certain input signals.

The power analysis process 635 inputs the SAIF file 630 and applies the recorded conditions to the power models of the library file 610 to obtain power estimates based on any state dependent power modeling, any path dependent power modeling and any 3-D power tables used within the library 610. For each library cell, the relevant counts recorded within the SAIF file 630 are applied to its power model to obtain an estimated power consumption for the library cell. An aggregation of all estimated power consumption amounts is reported in a power report 640. This power report 640 can then be used to determine if the integrated circuit design represented by the power models of the library file 610 meets prescribed power constraints.

CONCLUSION

The preferred embodiment of the present invention, state dependent power modeling, is thus described. While the present invention has been described in particular embodiments, it should be appreciated that the present invention should not be construed as limited by such embodiments, but rather construed according to the below claims.

What is claimed is:

1. In a computer controlled power estimation system, a computer implemented method for providing a power consumption model for a physical circuit of an integrated circuit device, said method comprising the steps of:

a) identifying a set of signals for a library cell representative of said physical circuit and storing designations of said set of signals into a computer readable memory;

b) designating at least one designated signal pin of said library cell and storing a signal pin designation thereof into said power consumption model of said library cell within said computer readable memory;

c) associated with said designated signal pin, defining a first state of said set of signals;

d) associated with said designated signal pin, defining a first power consumption function representative of power consumed by said physical circuit upon a transition on said designated signal pin provided said first state exists contemporaneously with said transition on said designated signal pin; and e) storing said first power consumption function and said first state into said power consumption model for said library cell of said computer readable memory.

2. A method as described in claim 1 further comprising the steps of:

f) associated with said designated signal pin, defining a second state of said set of signals;

g) associated with said designated signal pin, defining a second power consumption function representative of power consumed by said physical circuit upon a transition on said designated signal pin provided said second state exists contemporaneously with said transition on said designated signal pin; and h) storing said second power consumption function and said second state into said power consumption model for said library cell of said computer readable memory.

3. A method as described in claim 2 wherein said step g) comprises the steps of:

defining a second power lookup table containing second reference index values; and defining a second set of reference power values associated with said second reference index values, said second set of reference power values representing said power consumed by said physical circuit when said second state caused said designated signal pin to transition.

4. A method as described in claim 2 further comprising the steps of:

simulating an integrated circuit design including said library cell representation of said physical circuit;

monitoring said step of simulating for occurrences of said first state and said second state that exist contemporaneously with a transition on said designated signal pin of said library cell;

estimating power consumed by said library cell representation of said physical circuit using said power consumption model, said step of estimating further comprising the steps of:

estimating power consumed by said library cell based on said first power consumption function provided said first state exists contemporaneously with a transition on said designated signal pin; and estimating power consumed by said library cell based on said second power consumption function provided said second state exists contemporaneously with a transition on said designated signal pin; and summing said above power estimations of said library cell over an interval during which said step of simulating is performed.

5. A method as described in claim 1 further comprising the steps of:

designating a particular signal pin associated with a signal of said set of signals wherein a transition on said particular signal pin causes a transition on said designated signal pin; and defining a power consumption function representative of power consumed by said physical circuit upon a transition on said designated signal pin provided: (1) said first state exists contemporaneously with said transition on said designated signal pin; and (2) a transition occurs on said particular signal pin causing said transition on said designated signal pin.

6. A method as described in claim 1 wherein said designated signal pin is an output pin of said physical circuit.

7. A method as described in claim 1 wherein said designated signal pin is an input pin of said physical circuit.

8. A method as described in claim 1 wherein said step d) comprises the steps of:

defining a first power lookup table containing first reference index values; and defining a first set of reference power values associated with said first reference index values, said first set of reference power values representing said power consumed by said physical circuit when said first state caused said designated signal pin to transition.

9. In a computer controlled power estimation system, a computer implemented method for providing a power consumption model for a physical circuit, said method comprising the steps of:

a) identifying a set of signals for a library cell representative of said physical circuit and storing said set of signals into a computer readable memory;

b) designating at least one designated signal pin of said library cell and storing a signal pin designation thereof into said power consumption model of said library cell within said computer readable memory;

c) associated with said designated signal pin, defining a first state of said set of signals;

d) associated with said designated signal pin, defining a first power consumption function representative of power consumed by said physical circuit upon a transition on said designated signal pin provided said first state exists contemporaneously with said transition on said designated signal pin; and e) storing said first power consumption function and said first state into said power consumption model for said library cell of said computer readable memory;

f) associated with said designated signal pin, defining a second state of said set of signals;

g) associated with said designated signal pin, defining a second power consumption function representative of power consumed by said physical circuit upon a transition on said designated signal pin provided said second state exists contemporaneously with said transition on said designated signal pin; and h) storing said second power consumption function and said second state into said power consumption model for said library cell of said computer readable memory.

10. A method as described in claim 9 wherein said designated signal pin is an output pin of said physical circuit.

11. A method as described in claim 9 wherein said designated signal pin is an input pin of said physical circuit.

12. A method as described in claim 9 wherein said step d) comprises the steps of:

defining a first power lookup table containing first reference index values; and defining a first set of reference power values associated with said first reference index values, said first set of reference power values representing said power consumed by said physical circuit when said first state caused said designated signal pin to transition.

13. A method as described in claim 12 wherein said step g) comprises the steps of:

defining a second power lookup table containing second reference index values; and defining a second set of reference power values associated with said second reference index values, said second set of reference power values representing said power consumed by said physical circuit when said second state caused said designated signal pin to transition.

14. A method as described in claim 9 further comprising the steps of:

simulating an integrated circuit design including said library cell representation of said physical circuit;

monitoring said simulation for occurrences of said first state and said second state that exist contemporaneously with a transition on said designated signal pin of said library cell;

estimating power consumed by said library cell representation of said physical circuit using said power consumption model, said step of estimating further comprising the steps of:

estimating power consumed by said library cell based on said first power consumption function provided said first state exists contemporaneously with a transition on said designated signal pin; and estimating power consumed by said library cell based on said second power consumption function provided said second state exists contemporaneously with a transition on said designated signal pin; and summing said above power estimations of said library cell over an interval during which said step of simulating is performed.

15. A computer readable memory having stored therein a power consumption model used for estimating power consumed by a physical circuit of an integrated circuit device, said power model comprising:

a designation for a set of signals for a library cell representative of said physical circuit;

a designation of at least one designated signal pin of said library cell;

associated with said designated signal pin, a definition of a first state of said set of signals; and associated with said designated signal pin, a definition of a first power consumption function representative of power consumed by said physical circuit upon a transition on said designated signal pin provided said first state exists contemporaneously with said transition on said designated signal pin.

16. A computer readable memory as described in claim 15 further comprising:

a designation of a particular signal pin associated with a signal of said set of signals wherein a transition on said particular signal pin causes a transition on said designated signal pin; and associated with said designation signal pin, a definition of a second power consumption function representative of power consumed by said physical circuit upon a transition on said designated signal pin provided: (1) said first state exists contemporaneously with said transition on said designated signal pin; and (2) a transition occurs on said particular signal pin causing said transition on said designated signal pin.

17. A computer readable memory as described in claim 15 wherein said power consumption model further comprises:

associated with said designated signal pin, a definition of a second state of said set of signals; and associated with said designated signal pin, a definition of a second power consumption function representative of power consumed by said physical circuit upon a transition on said designated signal pin provided said second state exists contemporaneously with said transition on said designated signal pin.

18. A computer readable memory as described in claim 17 further comprising instruction code stored therein that when executed over a processor, causing a computer system to implement the following steps:

a) simulating an integrated circuit design including said library cell representation of said physical circuit;

b) monitoring said simulation for occurrences of said first state and said second state that exist contemporaneously with a transition on said designated signal pin to transition;

c) accessing said power consumption model to estimate power consumed by said physical circuit, said step of accessing comprising the following steps of:

i) estimating power consumed by said library cell representation of said physical circuit using said first power consumption function provided said first state exists contemporaneously with a transition on said designated signal pin; and ii) estimating power consumed by said library cell representation of said physical circuit using said second power consumption function provided said second state exists contemporaneously with a transition on said designated signal pin; and d) summing said above power estimations of said library cell representation of said physical circuit over an interval during which said step of simulating is performed.

19. A computer readable memory as described in claim 17 wherein said first power consumption function comprises:

a representation of a first power lookup table, said first power lookup table containing first reference index values; and a first set of reference power values associated with said first reference index values, said first set of reference power values representing said power consumed by said physical circuit when said first state exists contemporaneously with a transition on said designated signal pin.

20. A computer readable memory as described in claim 19 wherein said second power consumption function comprises:

a representation of a second power lookup table, said second power lookup table containing second reference index values; and a second set of reference power values associated with said second reference index values, said second set of reference power values representing said power consumed by said physical circuit when said second state exists contemporaneously with a transition on said designated signal pin.

21. A computer readable memory as described in claim 15 wherein said designated signal pin is an output pin of said physical circuit.

22. A computer readable memory as described in claim 15 wherein said designated signal pin is an input pin of said physical circuit.

23. In a computer controlled power estimation system, a computer implemented method for providing a power consumption model for a physical circuit of an integrated circuit device, said method comprising the steps of:

a) identifying a set of signals for a library cell representative of said physical circuit and storing designations of said set of signals into a computer readable memory;

b) associated with said library cell, defining a first state of said set of signals;

c) associated with said library cell, defining a first power consumption function representative of leakage power consumed by said physical circuit during an interval when said first state exists; and d) storing said first power consumption function and said first state into said power consumption model for said library cell of said computer readable memory.

\* \* \* \* \*